US012456572B2

(12) United States Patent
Yoshioka et al.

(10) Patent No.: US 12,456,572 B2
(45) Date of Patent: Oct. 28, 2025

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Kouji Yamauchi, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 768 days.

(21) Appl. No.: 17/399,943

(22) Filed: Aug. 11, 2021

(65) Prior Publication Data

US 2022/0059282 A1 Feb. 24, 2022

(30) Foreign Application Priority Data

Aug. 19, 2020 (JP) ................................ 2020-138877

(51) Int. Cl.

| | |
|---|---|
| ***H01F 27/29*** | (2006.01) |
| ***H01F 17/00*** | (2006.01) |
| ***H01F 27/32*** | (2006.01) |
| ***H01F 41/04*** | (2006.01) |

(52) U.S. Cl.

CPC ....... *H01F 27/292* (2013.01); *H01F 17/0013* (2013.01); *H01F 27/327* (2013.01); *H01F 41/041* (2013.01); *H01F 2017/0066* (2013.01)

(58) Field of Classification Search

CPC .. H01F 27/292; H01F 17/0013; H01F 27/327; H01F 2017/0066; H01F 2017/048; H01F 17/0006; H01F 17/04; H01F 27/2804; H01F 2027/2809

See application file for complete search history.

(56) References Cited

U.S. PATENT DOCUMENTS

2001/0017420 A1* 8/2001 Iwao .................. H01F 17/0013 257/693
2009/0116168 A1* 5/2009 Block .................... H01G 4/232 361/309

(Continued)

FOREIGN PATENT DOCUMENTS

JP 2001-307923 A 11/2001
JP 2018-046051 A 3/2018

(Continued)

*Primary Examiner* — Mang Tin Bik Lian
(74) *Attorney, Agent, or Firm* — Studebaker Brackett PLLC

(57) ABSTRACT

A body of an inductor component includes a magnetic layer, a first insulating resin, a second insulating resin, and an insulating layer. First inductor wiring extends along a principal surface of the body, inside the magnetic layer. First vertical wiring is connected to an upper surface of a first pad of the first inductor wiring. An upper surface of the first vertical wiring is exposed without being obstructed by the principal surface. A first outer terminal is connected to the upper surface of the first vertical wiring and protrudes from the principal surface upward in a thickness direction. The first outer terminal includes a metal layer covering the upper surface of the first vertical wiring and a solder portion on an upper surface of the metal layer. An upper portion including a protruding distal end of the first outer terminal is the solder portion made of a tin alloy.

19 Claims, 14 Drawing Sheets

(56) References Cited

U.S. PATENT DOCUMENTS

| | | | | |
|---|---|---|---|---|
| 2014/0292470 | A1* | 10/2014 | Yokoyama | H01F 5/00 336/200 |
| 2018/0323010 | A1* | 11/2018 | Park | H01G 2/065 |
| 2019/0206611 | A1* | 7/2019 | Matsumoto | H01F 17/04 |
| 2019/0244743 | A1* | 8/2019 | Hirai | H01F 41/12 |
| 2019/0304666 | A1* | 10/2019 | Arai | H05K 1/111 |
| 2020/0098506 | A1* | 3/2020 | Hamada | H01F 27/32 |

FOREIGN PATENT DOCUMENTS

| | | | |
|---|---|---|---|
| JP | 2018-113432 | A | 7/2018 |
| JP | 2019-176109 | A | 10/2019 |
| JP | 6614207 | B2 | 12/2019 |
| JP | 2020-053483 | A | 4/2020 |

* cited by examiner

INDUCTOR COMPONENT

CROSS-REFERENCE TO RELATED APPLICATION

This application claims benefit of priority to Japanese Patent Application No. 2020-138877, filed Aug. 19, 2020, the entire content of which is incorporated herein by reference.

BACKGROUND

Technical Field

The present disclosure relates to an inductor component.

Background Art

In an inductor component described in Japanese Patent No. 6614207, inductor wiring extends inside a body. An outer terminal is stacked on a principal surface of the body. The outer terminal is electrically connected to the inductor wiring. The material for the outer terminal is a metal, such as copper, silver, tin, or nickel.

SUMMARY

At the time of mounting an inductor component as described in Japanese Patent No. 6614207 on a surface of a substrate, solder may be first put on the surface of the substrate, and the inductor component may be then soldered by placing the inductor component on the substrate while heating and melting the solder. When the inductor component is mounted on the substrate by such soldering, it is difficult to accurately control the amount of solder to be applied to the surface of the substrate for each outer terminal of the inductor component. The amount of solder with respect to the outer terminal of the inductor component may be excessive or insufficient.

According to an aspect of the present disclosure, an inductor component includes a body which has a principal surface; inductor wiring which extends parallel to the principal surface inside the body; vertical wiring which is connected to the inductor wiring and extends in a thickness direction orthogonal to the principal surface to be exposed without being obstructed by the principal surface; and an outer terminal which is arranged on the vertical wiring exposed without being obstructed by the principal surface and at least part of which protrudes from the principal surface. The at least part of the outer terminal includes a distal end that protrudes and that is a solder portion which is made of an alloy of tin lower in melting point than the inductor wiring and the vertical wiring.

According to the above-described configuration, the part including the protruding distal end of the outer terminal is the solder portion. For this reason, at the time of mounting the inductor component on a substrate, solder need not necessarily be put on a surface of the substrate. It is thus possible to inhibit the amount of solder with respect to the inductor component from becoming excessive or insufficient due to the difficulty in controlling the amount of solder to be put on the substrate.

An inductor component which can be mounted using an appropriate amount of solder is provided.

Other features, elements, characteristics and advantages of the present disclosure will become more apparent from the following detailed description of preferred embodiments of the present disclosure (with reference to the attached drawings).

DETAILED DESCRIPTION

An embodiment of an inductor component will be described below. Note that the drawings may illustrate a constituent element on an enlarged scale for facilitating understanding. Dimensional ratios of constituent elements may be different from actual ones or those in other drawings.

Figure 1:
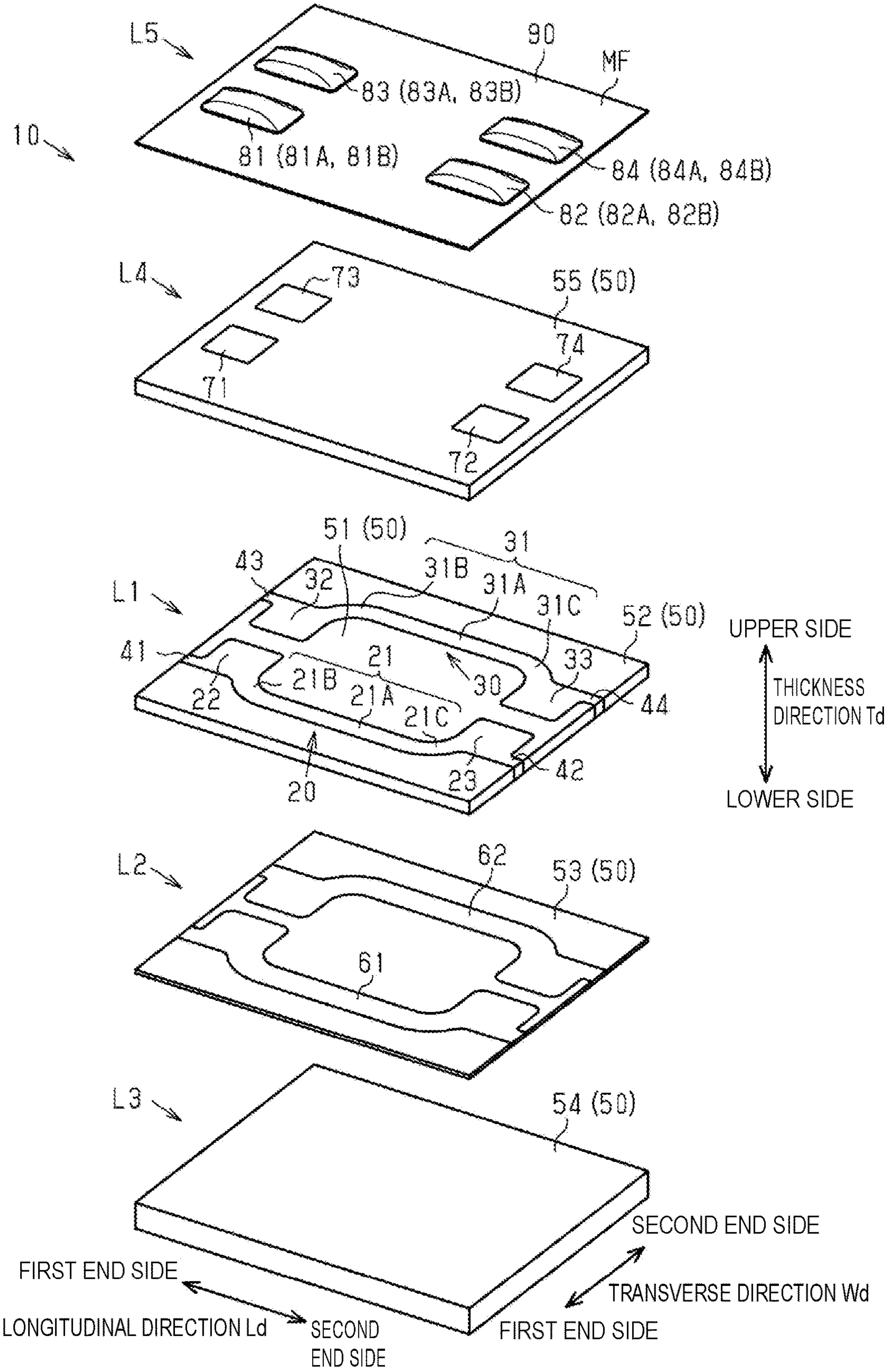
FIG. 1 is an exploded perspective view of an inductor component.

As shown in FIG. 1, an inductor component 10 has a structure with five layers stacked in a thickness direction Td on the whole. Note that one side in the thickness direction Td will be regarded as an upper side, and the opposite side will be regarded as a lower side in the following description.

A first layer L1 is composed of first inductor wiring 20, second inductor wiring 30, first dummy wiring 41, second dummy wiring 42, third dummy wiring 43, fourth dummy wiring 44, an inner magnetic circuit portion 51, and outer magnetic circuit portions 52. The first layer L1 has a substantially rectangular shape when viewed from the thickness direction Td. Note that a direction parallel to long sides of the substantially rectangular shape will be referred to as a longitudinal direction Ld and that a direction parallel to short sides will be referred to as a transverse direction Wd.

In the first layer L1, the first inductor wiring 20 is composed of a first wiring body 21, a first pad 22, and a second pad 23. The first wiring body 21 extends generally in the longitudinal direction Ld. The first wiring body 21 is located closer to a first end side in the transverse direction Wd than is a middle in the transverse direction Wd of the first layer L1.

A middle portion 21A in an extension direction of the first wiring body 21 extends in a substantially linear shape. A first end portion 21B which is an end portion on a first end side in the longitudinal direction Ld of the first wiring body 21 is bent. A second end portion 21C which is an end portion on a second end side in the longitudinal direction Ld of the first wiring body 21 is bent. The first end portion 21B and the second end portion 21C of the first wiring body 21 are both bent at approximately 90 degrees so as to face a middle side in the transverse direction Wd of the first layer L1.

The number of turns of the first inductor wiring 20 is defined on the basis of a virtual vector. A start point of the virtual vector is arranged on a virtual center line which passes through a middle of a wiring width of the first inductor wiring 20 and extends in an extension direction of the first inductor wiring 20. The number of turns is defined to be 1.0 in a case where the virtual vector the start point of which is arranged at one end of the virtual center line is moved to the other end on the first inductor wiring 20 when viewed from the thickness direction Td, and in a case where an angle by which a direction of the virtual vector rotates is 360 degrees. Thus, for example, if the first inductor wiring 20 is wound by 180 degrees, the number of turns is 0.5. In the present embodiment, the direction of the virtual vector virtually arranged on the first inductor wiring 20 is rotated by 90 degrees at the first end portion 21B and is rotated by 90 degrees at the second end portion 21C. For this reason, the number of turns the first inductor wiring 20 is wound is 0.5 in the present embodiment. Note that the first inductor wiring 20 is wound counterclockwise from the first pad 22 toward the second pad 23, when viewed from the upper side in the thickness direction Td. A winding direction of the first inductor wiring 20 when viewed from the upper side in the thickness direction Td is thus counterclockwise.

The first inductor wiring 20 is made of a conductive material. In the present embodiment, the composition of the first inductor wiring 20 is such that the percentage of copper is not less than about 99 wt % and such that the percentage of sulfur is not less than about 0.1 wt % and not more than about 1.0 wt % (i.e., from about 0.1 wt % to about 1.0 wt %).

The first pad 22 is connected to the first end portion 21B of the first inductor wiring 20. The first pad 22 has a substantially square shape when viewed from the thickness direction Td. A material for the first pad 22 is the same as that for the first wiring body 21.

The first dummy wiring 41 extends from the first pad 22 toward an outer edge of the first layer L1. The first dummy wiring 41 extends to a side surface on the first end side in the longitudinal direction Ld of the first layer L1 and is exposed on an outer surface of the inductor component 10.

The second pad 23 is connected to the second end portion 21C of the first inductor wiring 20. The second pad 23 has a substantially square shape when viewed from the thickness direction Td. A material for the second pad 23 is the same as that for the first wiring body 21.

The second dummy wiring 42 extends from the second pad 23 toward an outer edge of the first layer L1. The second dummy wiring 42 extends to a side surface on the second end side in the longitudinal direction Ld of the first layer L1 and is exposed on the outer surface of the inductor component 10. Note that the first wiring body 21, the first pad 22, the second pad 23, the first dummy wiring 41, and the second dummy wiring 42 are integral with one another in the present embodiment.

Figure 2:
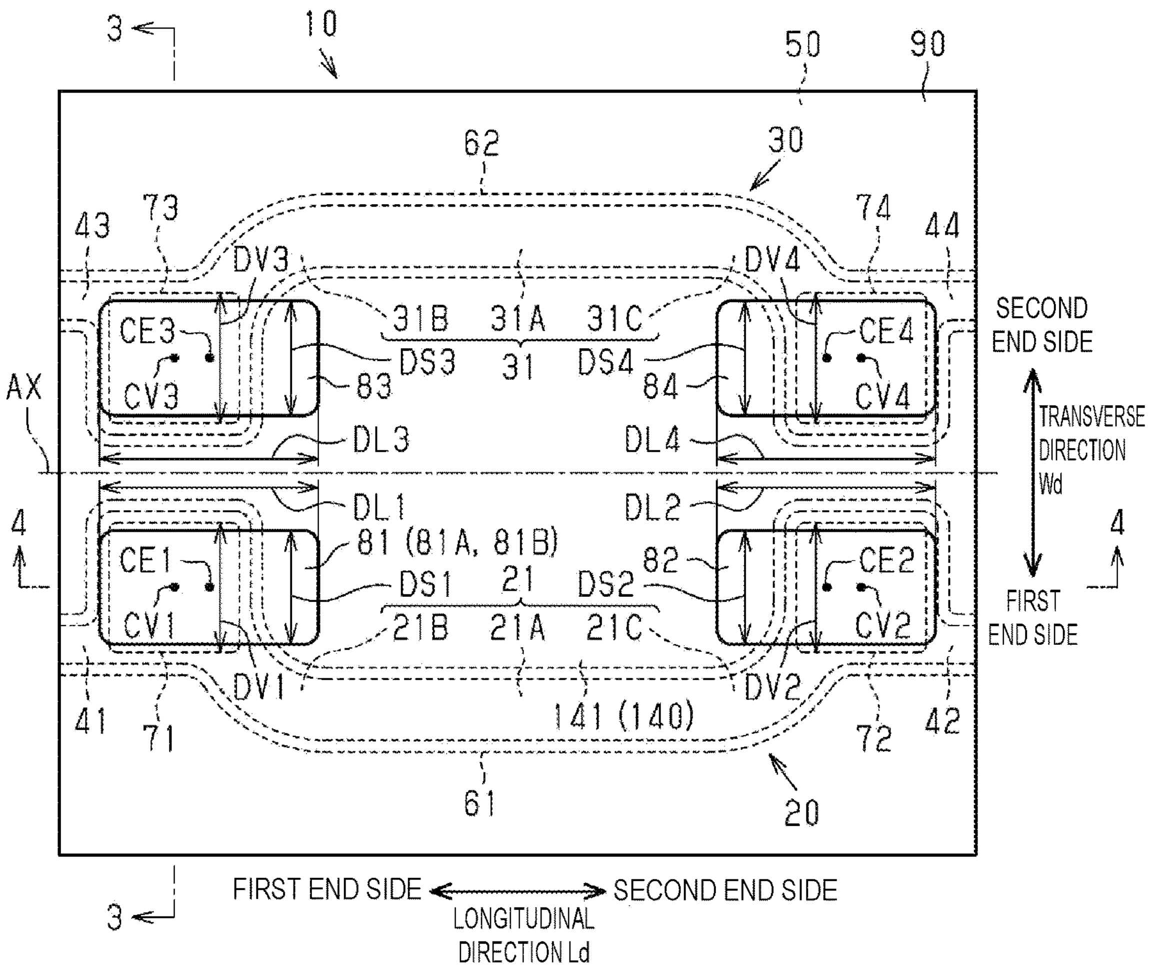
FIG. 2 is a transparent top view of the inductor component.

A straight line which passes through the middle in the transverse direction Wd of the first layer L1 and extends in the longitudinal direction Ld is referred to here as an axis AX of symmetry, as shown in FIG. 2. At the first layer L1, the second inductor wiring 30, the third dummy wiring 43, and the fourth dummy wiring 44 are arranged so as to be line-symmetric to the first inductor wiring 20, the first dummy wiring 41, and the second dummy wiring 42 with respect to the axis AX of symmetry.

As shown in FIG. 1, the second inductor wiring 30 is composed of a second wiring body 31, a third pad 32, and a fourth pad 33. The second wiring body 31 is located closer to a second end side in the transverse direction Wd than the middle in the transverse direction Wd of the substantially rectangular-shaped first layer L1 is, when viewed from the thickness direction Td.

A middle portion 31A in an extension direction of the second wiring body 31 extends in a substantially linear shape. A first end portion 31B which is an end portion on the first end side in the longitudinal direction Ld of the second wiring body 31 is bent. A second end portion 31C which is an end portion on the second end side in the longitudinal direction Ld of the second wiring body 31 is bent. The first end portion 31B and the second end portion 31C of the second wiring body 31 are both bent at approximately 90 degrees so as to face the middle side in the transverse direction Wd of the first layer L1.

The number of turns the second inductor wiring 30 is wound is 0.5, as in the first inductor wiring 20. Note that the second inductor wiring 30 is wound clockwise from the third pad 32 toward the fourth pad 33, when viewed from the upper side in the thickness direction Td. For this reason, a winding direction of the second inductor wiring 30 when viewed from the upper side in the thickness direction Td is clockwise. The winding direction of the first inductor wiring 20 is thus opposite to that of the second inductor wiring 30. The second inductor wiring 30 is made of the same conductive material as the first inductor wiring 20.

The third pad 32 is connected to the first end portion 31B of the second inductor wiring 30. The third pad 32 has a substantially square shape when viewed from the thickness direction Td. A material for the third pad 32 is the same as that for the second wiring body 31.

The third dummy wiring 43 extends from the third pad 32 toward the outer edge of the first layer L1. The third dummy wiring 43 extends to the side surface on the first end side in the longitudinal direction Ld of the first layer L1 and is exposed on the outer surface of the inductor component 10.

The fourth pad 33 is connected to the second end portion 31C of the second inductor wiring 30. The fourth pad 33 has a substantially square shape when viewed from the thickness direction Td. A material for the fourth pad 33 is the same as that for the second wiring body 31.

The fourth dummy wiring 44 extends from the fourth pad 33 toward the outer edge of the first layer L1. The fourth dummy wiring 44 extends to the side surface on the second end side in the longitudinal direction Ld of the first layer L1 and is exposed on the outer surface of the inductor component 10. Note that the second wiring body 31, the third pad 32, the fourth pad 33, the third dummy wiring 43, and the fourth dummy wiring 44 are integral with one another in the present embodiment.

At the first layer L1, a region between the first inductor wiring 20 and the second inductor wiring 30 is the inner magnetic circuit portion 51. A material for the inner magnetic circuit portion 51 is a magnetic material. Specifically, the material for the inner magnetic circuit portion 51 is a resin composite which contains metal magnetic powder made of an iron-silica alloy or an amorphous alloy or, more specifically, an amorphous alloy containing iron, silicon, and chromium.

At the first layer L1, a region outside the first inductor wiring 20 in the transverse direction Wd and a region outside the second inductor wiring 30 in the transverse direction Wd are the outer magnetic circuit portions 52 when viewed from the thickness direction Td. A material for the outer magnetic circuit portion 52 is the same magnetic material as that for the inner magnetic circuit portion 51.

A second layer L2 having a substantially rectangular shape which is the same as the first layer L1 when viewed from the thickness direction Td is stacked on a lower surface which is a surface on the lower side in the thickness direction Td of the first layer L1. The second layer L2 is composed of a first insulating resin 61, a second insulating resin 62, and an insulating resin magnetic layer 53.

The first insulating resin 61 covers the first inductor wiring 20, the first dummy wiring 41, and the second dummy wiring 42 from the lower side. The first insulating resin 61 has a shape which covers a range slightly wider than a range demarcated by outer edges of the first inductor wiring 20, the first dummy wiring 41, and the second dummy wiring 42, when viewed from the thickness direction Td. As a result, the first insulating resin 61 has a substantially strip shape which extends in the longitudinal direction Ld at the second layer L2 on the whole. The first insulating resin 61 is an insulative resin and is higher in insulation than the first inductor wiring 20, the inner magnetic circuit portion 51, the outer magnetic circuit portions 52, and the insulating resin magnetic layer 53.

The second insulating resin 62 covers the second inductor wiring 30, the third dummy wiring 43, and the fourth dummy wiring 44 from the lower side. The second insulating resin 62 has a shape which covers a range slightly wider than a range demarcated by outer edges of the second inductor wiring 30, the third dummy wiring 43, and the fourth dummy wiring 44, when viewed from the thickness direction Td. As a result, the second insulating resin 62 has a substantially strip shape which extends in the longitudinal direction Ld at the second layer L2 on the whole. The second insulating resin 62 is an insulative resin and is higher in insulation than the second inductor wiring 30.

The second layer L2 excluding the first insulating resin 61 and the second insulating resin 62 is the insulating resin magnetic layer 53. A material for the insulating resin magnetic layer 53 is the same magnetic material as materials for the inner magnetic circuit portion 51 and the outer magnetic circuit portions 52 described above.

A third layer L3 having a substantially rectangular shape which is the same as the second layer L2 when viewed from the thickness direction Td is stacked on a lower surface which is a surface on the lower side in the thickness direction Td of the second layer L2. The third layer L3 is a first magnetic layer 54. For this reason, the first magnetic layer 54 is arranged below the first inductor wiring 20 and the second inductor wiring 30. The first magnetic layer 54 is made of a magnetic material. Specifically, the first magnetic layer 54 is made of a resin composite which contains metal magnetic powder made of an iron-silica alloy or an amorphous alloy, like the inner magnetic circuit portion 51, the outer magnetic circuit portions 52, and the insulating resin magnetic layer 53 described above.

Meanwhile, a fourth layer L4 having a substantially rectangular shape which is the same as the first layer L1 when viewed from the thickness direction Td is stacked on an upper surface which is a surface on the upper side in the thickness direction Td of the first layer L1. The fourth layer L4 is composed of first vertical wiring 71, second vertical wiring 72, third vertical wiring 73, fourth vertical wiring 74, and a second magnetic layer 55.

The first vertical wiring 71 is directly connected to an upper surface of the first pad 22 with no layer interposed therebetween. A material for the first vertical wiring 71 is the same as that for the first inductor wiring 20. The first vertical wiring 71 is wiring which extends in the thickness direction Td. Specifically, the first vertical wiring 71 has a substantially square prism shape, and a direction of axis of the substantially square prism coincides with the thickness direction Td.

As shown in FIG. 2, when viewed from the thickness direction Td, a dimension DV1 of each side of the substantially square-shaped first vertical wiring 71 is slightly smaller than a dimension of each side of the substantially square-shaped first pad 22. Note that, since the first vertical wiring 71 has the substantially square prism shape, a geometric center CV1 of an upper end face of the first vertical wiring 71 is located on a central axis of the substantially square prism-shaped first vertical wiring 71 when viewed from the upper side in the thickness direction Td. When viewed from the thickness direction Td, a geometric center of the first pad 22 coincides with the geometric center CV1 of the first vertical wiring 71.

As shown in FIG. 1, the second vertical wiring 72 is directly connected to an upper surface of the second pad 23 with no layer interposed therebetween. A material for the second vertical wiring 72 is the same as that for the first inductor wiring 20. The second vertical wiring 72 has a substantially square prism shape, and a direction of axis of the substantially square prism coincides with the thickness direction Td.

As shown in FIG. 2, when viewed from the thickness direction Td, a dimension DV2 of each side of the substantially square-shaped second vertical wiring 72 is slightly smaller than a dimension of each side of the substantially square-shaped second pad 23. Note that, since the second vertical wiring 72 has the substantially square prism shape, a geometric center CV2 of an upper end face of the second vertical wiring 72 is located on a central axis of the substantially square prism-shaped second vertical wiring 72 when viewed from the upper side in the thickness direction Td. When viewed from the thickness direction Td, a geometric center of the second pad 23 coincides with the geometric center CV2 of the second vertical wiring 72.

As shown in FIG. 1, the third vertical wiring 73 is directly connected to an upper surface of the third pad 32 with no layer interposed therebetween. A material for the third vertical wiring 73 is the same as that for the second inductor wiring 30. The third vertical wiring 73 has the substantially square prism shape, and a direction of axis of the substantially square prism coincides with the thickness direction Td.

As shown in FIG. 2, when viewed from the thickness direction Td, a dimension DV3 of each side of the substantially square-shaped third vertical wiring 73 is slightly smaller than a dimension of each side of the substantially square-shaped third pad 32. Note that, since the third vertical wiring 73 has the substantially square prism shape, a geometric center CV3 of an upper end face of the third vertical wiring 73 is located on a central axis of the substantially square prism-shaped third vertical wiring 73 when viewed from the upper side in the thickness direction Td. When viewed from the thickness direction Td, a geometric center of the third pad 32 coincides with the geometric center CV3 of the third vertical wiring 73.

As shown in FIG. 1, the fourth vertical wiring 74 is directly connected to an upper surface of the fourth pad 33 with no layer interposed therebetween. A material for the fourth vertical wiring 74 is the same as that for the second inductor wiring 30. The fourth vertical wiring 74 has a substantially square prism shape, and a direction of axis of the substantially square prism coincides with the thickness direction Td.

As shown in FIG. 2, when viewed from the thickness direction Td, a dimension DV4 of each side of the substantially square-shaped fourth vertical wiring 74 is slightly smaller than a dimension of each side of the substantially square-shaped fourth pad 33. Note that, since the fourth vertical wiring 74 has the substantially square prism shape, a geometric center CV4 of an upper end face of the fourth vertical wiring 74 is located on a central axis of the substantially square prism-shaped fourth vertical wiring 74 when viewed from the upper side in the thickness direction Td. When viewed from the thickness direction Td, a geometric center of the fourth pad 33 coincides with the geometric center CV4 of the fourth vertical wiring 74.

As shown in FIG. 1, the fourth layer L4 excluding the first vertical wiring 71, the second vertical wiring 72, the third vertical wiring 73, and the fourth vertical wiring 74 is the second magnetic layer 55. For this reason, the second magnetic layer 55 is stacked on an upper surface of the first inductor wiring 20. A material for the second magnetic layer 55 is the same magnetic material as that for the first magnetic layer 54 described above.

In the inductor component 10, the inner magnetic circuit portion 51, the outer magnetic circuit portions 52, the insulating resin magnetic layer 53, the first magnetic layer 54, and the second magnetic layer 55 constitute a magnetic layer 50. The inner magnetic circuit portion 51, the outer magnetic circuit portions 52, the insulating resin magnetic layer 53, the first magnetic layer 54, and the second magnetic layer 55 are connected together to surround the first inductor wiring 20 and the second inductor wiring 30. As described above, the magnetic layer 50 constitutes a closed magnetic circuit for the first inductor wiring 20 and the second inductor wiring 30. For this reason, the first inductor wiring 20 and the second inductor wiring 30 extend inside the magnetic layer 50. Note that, although the inner magnetic circuit portion 51, the outer magnetic circuit portions 52, the insulating resin magnetic layer 53, the first magnetic layer 54, and the second magnetic layer 55 are distinctively shown, the components are integrated together as the magnetic layer 50. Note that the expression "the magnetic layer 50 is integral" here also refers to a case where an interface is inside the magnetic layer 50 and a case where no interface is inside the magnetic layer 50. For example, if the inductor component 10 is manufactured by a manufacturing method (to be described later), there is no interface at a border between the insulating resin magnetic layer 53 and the first magnetic layer 54, and there is no interface at a border between the inner magnetic circuit portion 51 and outer magnetic circuit portions 52 and the second magnetic layer 55. On the other hand, there is an interface at a border between the inner magnetic circuit portion 51 and the insulating resin magnetic layer 53. Even in this case, the inner magnetic circuit portion 51, the outer magnetic circuit portions 52, the insulating resin magnetic layer 53, the first magnetic layer 54, and the second magnetic layer 55 are integral with one another.

A fifth layer L5 having a substantially rectangular shape which is the same as the fourth layer L4 when viewed from the thickness direction Td is stacked on an upper surface which is a surface on the upper side in the thickness direction Td of the fourth layer L4. The fifth layer L5 is composed of a first outer terminal 81, a second outer terminal 82, a third outer terminal 83, a fourth outer terminal 84, and an insulating layer 90.

Figure 3:
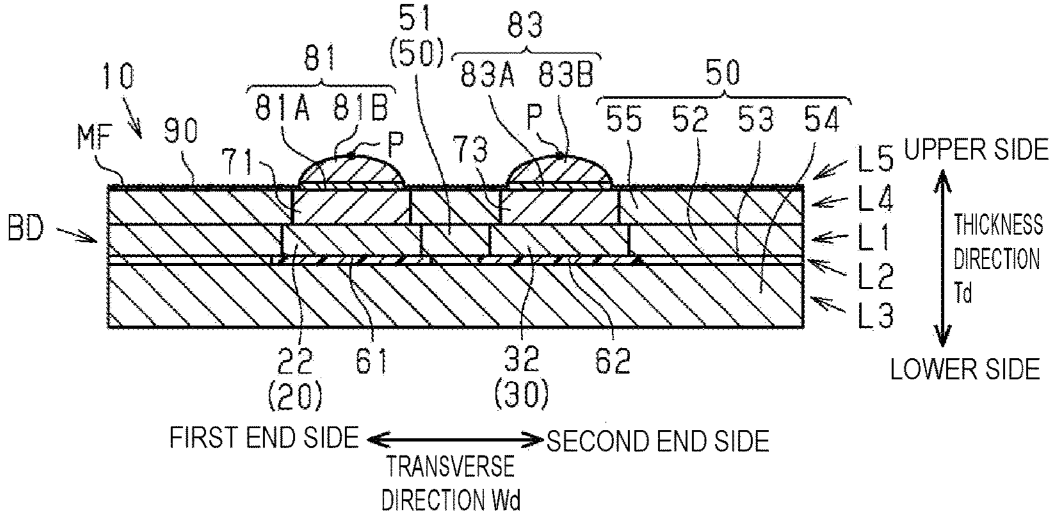
FIG. 3 is a sectional view of the inductor component taken along line 3-3 in FIG. 2.

As shown in FIG. 3, the first outer terminal 81 is directly connected to an upper surface of the first vertical wiring 71 with no layer interposed therebetween. As shown in FIG. 2, the first outer terminal 81 has a substantially rectangular shape when viewed from the thickness direction Td. Long sides of the substantially rectangular shape of the first outer terminal 81 extend parallel to the longitudinal direction Ld at the fifth layer L5, and short sides extend parallel to the transverse direction Wd at the fifth layer L5.

The second outer terminal 82 is directly connected to an upper surface of the second vertical wiring 72 with no layer interposed therebetween. The second outer terminal 82 has a substantially rectangular shape when viewed from the thickness direction Td. Long sides of the substantially rectangular shape of the second outer terminal 82 extend parallel to the longitudinal direction Ld at the fifth layer L5, and short sides extend parallel to the transverse direction Wd at the fifth layer L5.

As shown in FIG. 3, the third outer terminal 83 is directly connected to an upper surface of the third vertical wiring 73 with no layer interposed therebetween. As shown in FIG. 2, the third outer terminal 83 has a substantially rectangular shape when viewed from the thickness direction Td. Long sides of the substantially rectangular shape of the third outer terminal 83 extend parallel to the longitudinal direction Ld at the fifth layer L5, and short sides extend parallel to the transverse direction Wd at the fifth layer L5.

The fourth outer terminal 84 is directly connected to an upper surface of the fourth vertical wiring 74 with no layer interposed therebetween. The fourth outer terminal 84 has a substantially rectangular shape when viewed from the thickness direction Td. Long sides of the substantially rectangular shape of the fourth outer terminal 84 extend parallel to the longitudinal direction Ld at the fifth layer L5, and short sides extend parallel to the transverse direction Wd at the fifth layer L5.

The fifth layer L5 excluding the first outer terminal 81, the second outer terminal 82, the third outer terminal 83, and the fourth outer terminal 84 is the insulating layer 90. In other words, of the upper surface of the fourth layer L4, a range not covered by the first outer terminal 81, the second outer terminal 82, the third outer terminal 83, and the fourth outer terminal 84 is covered by the insulating layer 90 of the fifth layer L5. The insulating layer 90 provides higher insulation than the magnetic layer 50, and a material for the insulating layer 90 is an epoxy-based resin material. In the present embodiment, the insulating layer 90 is a solder resist. A dimension in the thickness direction Td of the insulating layer 90 is smaller than any of dimensions in the thickness direction Td of the first outer terminal 81, the second outer terminal 82, the third outer terminal 83, and the fourth outer terminal 84.

In the present embodiment, the magnetic layer 50, the first insulating resin 61, the second insulating resin 62, and the insulating layer 90 constitute a body BD. Of a surface of the body BD, a surface on the upper side in the thickness direction Td of the insulating layer 90 is a principal surface MF. For this reason, of the upper surface of the first vertical wiring 71, a portion in contact with the first outer terminal 81 is exposed toward the upper side in the thickness direction Td without being obstructed by the principal surface MF. Similarly, of the upper surface of the second vertical wiring 72, a portion in contact with the second outer terminal 82 is exposed toward the upper side in the thickness direction Td without being obstructed by the principal surface MF. Of the upper surface of the third vertical wiring 73, a portion in contact with the third outer terminal 83 is exposed toward the upper side in the thickness direction Td without being obstructed by the principal surface ME Of the upper surface of the fourth vertical wiring 74, a portion in contact with the fourth outer terminal 84 is exposed toward the upper side in the thickness direction Td without being obstructed by the principal surface ME The expression "something is exposed without being obstructed by the principal surface MF" means that something need not protrude outward from the principal surface MF and may be covered by a different member but is not covered by the principal surface MF. Note that the first layer L1 including the first inductor wiring 20 and the second inductor wiring 30 is parallel to the principal surface MF.

Here, the first outer terminal 81 will be described in detail. As shown in FIG. 3, the first outer terminal 81 is composed of a metal layer 81A and a solder portion 81B.

The metal layer 81A covers a portion of the first vertical wiring 71 which is exposed without being obstructed by the principal surface ME The metal layer 81A has a substantially thin film shape which has a small dimension in the thickness direction Td on the whole. An upper surface of the metal layer 81A is located higher than the upper surface of the insulating layer 90. A material for the metal layer 81A is a conductive material. Note that although not shown, the metal layer 81A has a structure with three layers of copper, nickel, and gold in the present embodiment.

As shown in FIG. 2, when viewed from the thickness direction Td, a dimension DL1 of a long side of the metal layer 81A is larger than the dimension DV1 of one side of the substantially square-shaped first vertical wiring 71 when viewed from the thickness direction Td. In the present embodiment, the dimension DL1 in the longitudinal direction Ld of the metal layer 81A is about 1.5 times the dimension DV1 in the longitudinal direction Ld of the first vertical wiring 71. An end on the first end side in the longitudinal direction Ld of the metal layer 81A is located closer to the first end side in the longitudinal direction Ld than is an end on the first end side in the longitudinal direction Ld of the first vertical wiring 71. An end on the second end side in the longitudinal direction Ld of the metal layer 81A is located closer to the second end side in the longitudinal direction Ld than is an end on the second end side in the longitudinal direction Ld of the first vertical wiring 71. For this reason, the metal layer 81A covers a range from the upper surface of the first vertical wiring 71 to a portion, which is not covered by the insulating layer 90, of an upper surface of the second magnetic layer 55. A middle position in the longitudinal direction Ld in the metal layer 81A is located closer to the second end side in the longitudinal direction Ld than is a middle position in the longitudinal direction Ld in the first vertical wiring 71. Thus, when viewed from the thickness direction Td, a geometric center CE1 of the metal layer 81A deviates from the geometric center CV1 of the first vertical wiring 71 to the second end side in the longitudinal direction Ld. On the other hand, when viewed from the thickness direction Td, the geometric center CE1 of the metal layer 81A falls within a range occupied by the first vertical wiring 71.

A dimension DS1 of a short side of the substantially rectangular-shaped metal layer 81A when viewed from the thickness direction Td is slightly smaller than the dimension DV1 of one side of the substantially square-shaped first vertical wiring 71 when viewed from the thickness direction Td. A middle position in the transverse direction Wd in the metal layer 81A coincides with a middle position in the transverse direction Wd in the first vertical wiring 71. When viewed from the thickness direction Td, an area of a range occupied by the metal layer 81A is larger than an area of a range, which is exposed without being obstructed by the principal surface MF, of the first vertical wiring 71.

Figure 4A:
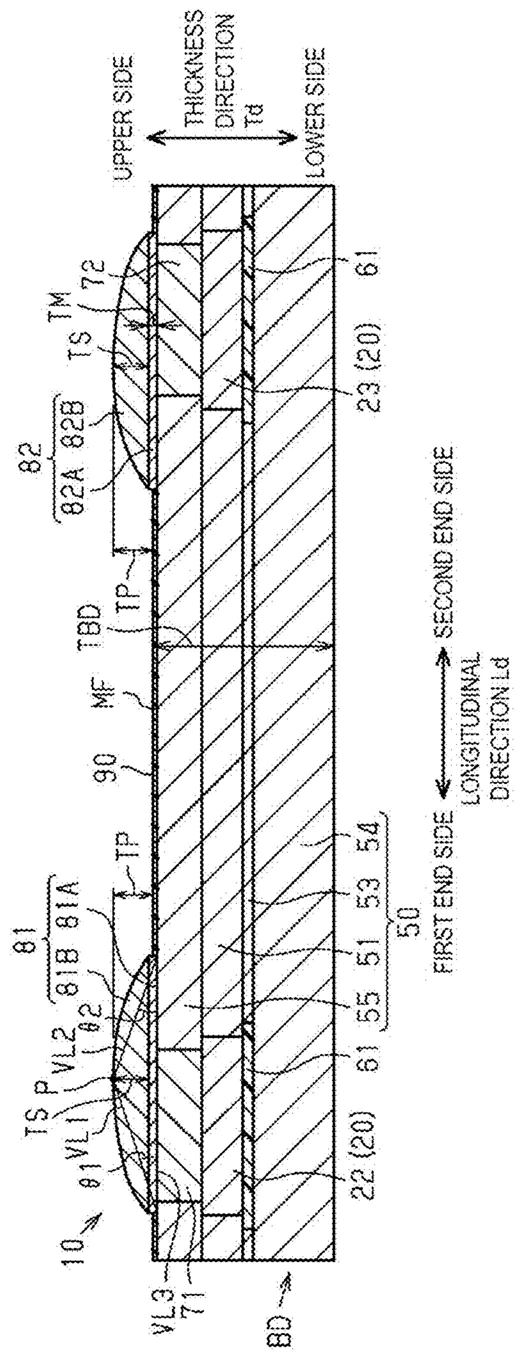
FIG. 4A is a sectional view of the inductor component taken along line 4-4 in FIG. 2.

As shown in FIG. 4A, the upper surface of the metal layer 81A is entirely covered by the solder portion 81B. For this reason, an upper portion of the first outer terminal 81, including a protruding distal end P which is a distal end protruding from the principal surface MF in the thickness direction Td, is the solder portion 81B. A material for the solder portion 81B is a material lower in melting point than the first inductor wiring 20 and the first vertical wiring 71 and is an alloy containing, as main ingredients, lead and tin in the present embodiment. A dimension TS in the thickness direction Td of the solder portion 81B, that is, a distance from the upper surface of the metal layer 81A to the protruding distal end P of the solder portion 81B is larger than a dimension TM in the thickness direction Td of the metal layer 81A, that is, a distance from the upper surface of the first vertical wiring 71 to the upper surface of the metal layer 81A.

Figure 4B:
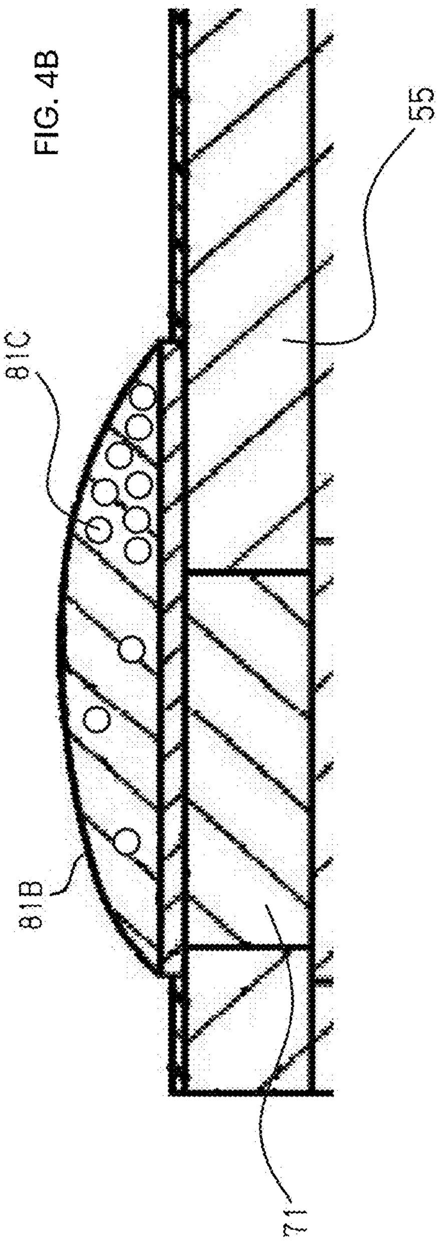
FIG. 4B is a magnified view of a portion of FIG. 4A.

There are a plurality of voids 81C inside the solder portion 81B. When viewed from the thickness direction Td, the number of voids 81C contained in a portion above the first vertical wiring 71 of the solder portion 81B is smaller than the number of voids 81C contained in a portion above the second magnetic layer 55. An exemplary arrangement of voids 81C is illustrated in FIG. 4B. The amount of voids 81C contained in each portion of the solder portion 81B can be measured by calculating a total area of ranges occupied by the voids 81C in the portion of the solder portion 81B with respect to a sectional area of the portion when a section which includes the protruding distal end P of the first outer terminal 81 and is parallel to the longitudinal direction Ld is viewed at 1000-fold magnification under an electron microscope.

As shown in FIG. 2, when viewed from the thickness direction Td, the solder portion 81B has a substantially rectangular shape which is the same as the metal layer 81A.

Thus, shapes of the metal layer 81A and the solder portion 81B when viewed from the thickness direction Td are identical to that of the first outer terminal 81. The geometric center CE1 of the metal layer 81A is a geometric center of the first outer terminal 81.

As shown in FIG. 3, when the solder portion 81B is viewed from the longitudinal direction Ld, a dimension in the thickness direction Td increases toward a middle in the transverse direction Wd of the solder portion 81B. When viewed from the longitudinal direction Ld, a surface on the upper side in the thickness direction Td of the solder portion 81B has a substantially curved shape, a curvature of which decreases toward the upper side in the thickness direction Td. A position of the protruding distal end P of the solder portion 81B coincides with a middle of the first vertical wiring 71 in the transverse direction Wd.

As shown in FIG. 4A, when the solder portion 81B is viewed from the transverse direction Wd, the dimension in the thickness direction Td increases toward a middle in the longitudinal direction Ld of the solder portion 81B. When viewed from the transverse direction Wd, the surface on the upper side in the thickness direction Td of the solder portion 81B has a substantially curved shape, a curvature of which decreases toward the upper side in the thickness direction Td. The position of the protruding distal end P of the solder portion 81B is located closer to a middle side at the fifth layer L5 than a middle of the first vertical wiring 71 is, in the longitudinal direction Ld.

A distance TP in the thickness direction Td from the principal surface MF to the protruding distal end P of the first outer terminal 81 is less than about one-half of a dimension TBD in the thickness direction Td of the body BD and is about 0.2 times in this embodiment. The dimension TS in the thickness direction Td of the solder portion 81B, that is, the distance from the upper surface of the metal layer 81A to the protruding distal end P of the solder portion 81B is not less than about one-tenth of the dimension TBD in the thickness direction Td of the body BD and is about 0.17 times in this embodiment. Note that a dimension in the thickness direction Td of each outer terminal including the solder portion is not included in the dimension TBD in the thickness direction Td of the body BD. The dimension TBD in the thickness direction Td of the body BD is an average value of dimensions in the thickness direction Td which are measured at five equally spaced points in a section which passes through a center of the body BD and is parallel to the longitudinal direction Ld when viewed from the thickness direction Td.

As shown in FIG. 2, when viewed from the thickness direction Td, a geometric center of the solder portion 81B coincides with the geometric center CE1 of the first outer terminal 81. For this reason, when viewed from the thickness direction Td, the geometric center CE1 of the first outer terminal 81 deviates from the geometric center CV1 of the first vertical wiring 71 to the middle side in the fifth layer L5 in the longitudinal direction Ld. On the other hand, when viewed from the thickness direction Td, the geometric center CE1 of the first outer terminal 81 is located within the upper surface of the first vertical wiring 71 that is the range occupied by the first vertical wiring 71.

When viewed from the thickness direction Td, the shape of the solder portion 81B coincides with that of the first outer terminal 81. For this reason, the dimension DL1 in the longitudinal direction Ld of the solder portion 81B is larger than the dimension DS1 in the transverse direction Wd of the solder portion 81B. The dimension DL1 in the longitudinal direction Ld of the solder portion 81B is larger than the dimension DV1 in the longitudinal direction Ld of the first vertical wiring 71.

As shown in FIG. 4A, in a section which is orthogonal to the transverse direction Wd and includes the protruding distal end P of the first outer terminal 81, a line segment which connects the protruding distal end P and a lower end on the first end side in the longitudinal direction Ld of the first outer terminal 81 is referred to as a first line segment VL1. A line segment which connects the protruding distal end P and a lower end on the second end side in the longitudinal direction Ld of the first outer terminal 81 is referred to as a second line segment VL2. A line segment which connects the lower end on the first end side in the longitudinal direction Ld of the first outer terminal 81 and the lower end on the second end side in the longitudinal direction Ld of the first outer terminal 81 is referred to as a third line segment VL3. A first angle θ1 which is an acute angle which the first line segment VL1 forms with the third line segment VL3 is about 14 degrees. A second angle θ2 which is an acute angle which the third line segment VL3 forms with the second line segment VL2 is about 15 degrees. For this reason, a difference between the first angle θ1 and the second angle θ2 is about 1 degree.

Dimensional relationships of the second outer terminal 82 will next be described. As shown in FIG. 2, a dimension DL2 of a long side of the substantially rectangular-shaped second outer terminal 82 when viewed from the thickness direction Td is larger than the dimension DV2 of one side of the substantially square-shaped second vertical wiring 72 when viewed from the thickness direction Td. In the present embodiment, the dimension DL2 in the longitudinal direction Ld of the second outer terminal 82 is about 1.5 times the dimension DV2 in the longitudinal direction Ld of the second vertical wiring 72. An end on the first end side in the longitudinal direction Ld of the second outer terminal 82 is located closer to the first end side in the longitudinal direction Ld than is an end on the first end side in the longitudinal direction Ld of the second vertical wiring 72. An end on the second end side in the longitudinal direction Ld of the second outer terminal 82 is located closer to the second end side in the longitudinal direction Ld than is an end on the second end side in the longitudinal direction Ld of the second vertical wiring 72. For this reason, the second outer terminal 82 covers a range from the upper surface of the second vertical wiring 72 to the upper surface of the second magnetic layer 55. A middle position in the longitudinal direction Ld in the second outer terminal 82 is located closer to the first end side in the longitudinal direction Ld than is a middle position in the longitudinal direction Ld in the second vertical wiring 72. Thus, when viewed from the thickness direction Td, a geometric center CE2 of the second outer terminal 82 deviates from the geometric center CV2 of the second vertical wiring 72 to the first end side in the longitudinal direction Ld. On the other hand, when viewed from the thickness direction Td, the geometric center CE2 of the second outer terminal 82 falls within a range occupied by the second vertical wiring 72.

A dimension DS2 of a short side of the substantially rectangular-shaped second outer terminal 82 when viewed from the thickness direction Td is slightly smaller than the dimension DV2 of one side of the substantially square-shaped second vertical wiring 72 when viewed from the thickness direction Td. A middle position in the transverse direction Wd in the second outer terminal 82 coincides with a middle position in the transverse direction Wd in the second vertical wiring 72. When viewed from the thickness direction Td, an area of a range occupied by the second outer terminal 82 is larger than an area of a range, which is exposed without being obstructed by the principal surface MF, of the second vertical wiring 72.

Dimensional relationships of the third outer terminal 83 will next be described. A dimension DL3 of a long side of the substantially rectangular-shaped third outer terminal 83 when viewed from the thickness direction Td is larger than the dimension DV3 of one side of the substantially square-shaped third vertical wiring 73 when viewed from the thickness direction Td. In the present embodiment, the dimension DL3 in the longitudinal direction Ld of the third outer terminal 83 is about 1.5 times the dimension DV3 in the longitudinal direction Ld of the third vertical wiring 73. An end on the first end side in the longitudinal direction Ld of the third outer terminal 83 is located closer to the first end side in the longitudinal direction Ld than is an end on the first end side in the longitudinal direction Ld of the third vertical wiring 73. An end on the second end side in the longitudinal direction Ld of the third outer terminal 83 is located closer to the second end side in the longitudinal direction Ld than is an end on the second end side in the longitudinal direction Ld of the third vertical wiring 73. For this reason, the third outer terminal 83 covers a range from the upper surface of the third vertical wiring 73 to the upper surface of the second magnetic layer 55. A middle position in the longitudinal direction Ld in the third outer terminal 83 is located closer to the second end side in the longitudinal direction Ld than a middle position in the longitudinal direction Ld in the third vertical wiring 73. Thus, when viewed from the thickness direction Td, a geometric center CE3 of the third outer terminal 83 deviates from the geometric center CV3 of the third vertical wiring 73 to the second end side in the longitudinal direction Ld. On the other hand, when viewed from the thickness direction Td, the geometric center CE3 of the third outer terminal 83 falls within a range occupied by the third vertical wiring 73.

A dimension DS3 of a short side of the substantially rectangular-shaped third outer terminal 83 when viewed from the thickness direction Td is slightly smaller than the dimension DV3 of one side of the substantially square-shaped third vertical wiring 73 when viewed from the thickness direction Td. A middle position in the transverse direction Wd in the third outer terminal 83 coincides with a middle position in the transverse direction Wd in the third vertical wiring 73. When viewed from the thickness direction Td, an area of a range occupied by the third outer terminal 83 is larger than an area of a range, which is exposed without being obstructed by the principal surface MF, of the third vertical wiring 73.

Dimensional relationships of the fourth outer terminal 84 will next be described. A dimension DL4 of a long side of the substantially rectangular-shaped fourth outer terminal 84 when viewed from the thickness direction Td is larger than the dimension DV4 of one side of the substantially square-shaped fourth vertical wiring 74 when viewed from the thickness direction Td. In the present embodiment, the dimension DL4 in the longitudinal direction Ld of the fourth outer terminal 84 is about 1.5 times the dimension DV4 in the longitudinal direction Ld of the fourth vertical wiring 74. An end on the first end side in the longitudinal direction Ld of the fourth outer terminal 84 is located closer to the first end side in the longitudinal direction Ld than is an end on the first end side in the longitudinal direction Ld of the fourth vertical wiring 74. An end on the second end side in the longitudinal direction Ld of the fourth outer terminal 84 is located closer to the second end side in the longitudinal direction Ld than is an end on the second end side in the longitudinal direction Ld of the fourth vertical wiring 74. For this reason, the fourth outer terminal 84 covers a range from the upper surface of the fourth vertical wiring 74 to the upper surface of the second magnetic layer 55. A middle position in the longitudinal direction Ld in the fourth outer terminal 84 is located closer to the first end side in the longitudinal direction Ld than a middle position in the longitudinal direction Ld in the fourth vertical wiring 74. Thus, when viewed from the thickness direction Td, a geometric center CE4 of the fourth outer terminal 84 deviates from the geometric center CV4 of the fourth vertical wiring 74 to the first end side in the longitudinal direction Ld. On the other hand, when viewed from the thickness direction Td, the geometric center CE4 of the fourth outer terminal 84 falls within a range occupied by the fourth vertical wiring 74.

A dimension DS4 of a short side of the substantially rectangular-shaped fourth outer terminal 84 when viewed from the thickness direction Td is slightly smaller than the dimension DV4 of one side of the substantially square-shaped fourth vertical wiring 74 when viewed from the thickness direction Td. A middle position in the transverse direction Wd in the fourth outer terminal 84 coincides with a middle position in the transverse direction Wd in the fourth vertical wiring 74. When viewed from the thickness direction Td, an area of a range occupied by the fourth outer terminal 84 is larger than an area of a range, which is exposed without being obstructed by the principal surface MF, of the fourth vertical wiring 74.

Note that, since the second outer terminal 82, the third outer terminal 83, and the fourth outer terminal 84 have the same configurations as the first outer terminal 81 described above, a detailed description thereof will be omitted. In the drawings, a metal layer and a solder portion of the second outer terminal 82 are made to correspond to the metal layer 81A and the solder portion 81B of the first outer terminal 81 and are referred to as a metal layer 82A and a solder portion 82B of the second outer terminal 82. Similarly, a metal layer and a solder portion of the third outer terminal 83 are referred to as a metal layer 83A and a solder portion 83B of the third outer terminal 83, and a metal layer and a solder portion of the fourth outer terminal 84 are referred to as a metal layer 84A and a solder portion 84B of the fourth outer terminal 84.

An embodiment of a method for manufacturing the inductor component 10 will next be described.

Figure 5:
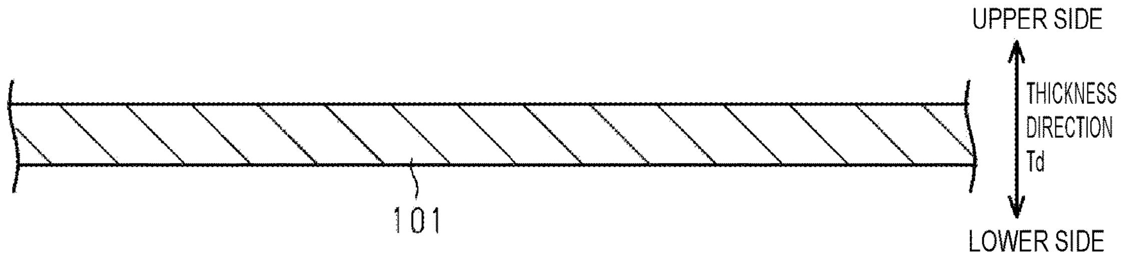
FIG. 5 is an explanatory view of a method for manufacturing the inductor component.

As shown in FIG. 5, a base member preparation process is first performed. Specifically, a substantially plate-shaped base member 101 is prepared. A material for the base member 101 is ceramic. The base member 101 has a substantially quadrangular shape when viewed from the thickness direction Td. Dimensions of sides are set so as to accommodate a plurality of inductor components 10. A direction orthogonal to a planar direction of the base member 101 will be regarded as the thickness direction Td in the following description.

Figure 6:
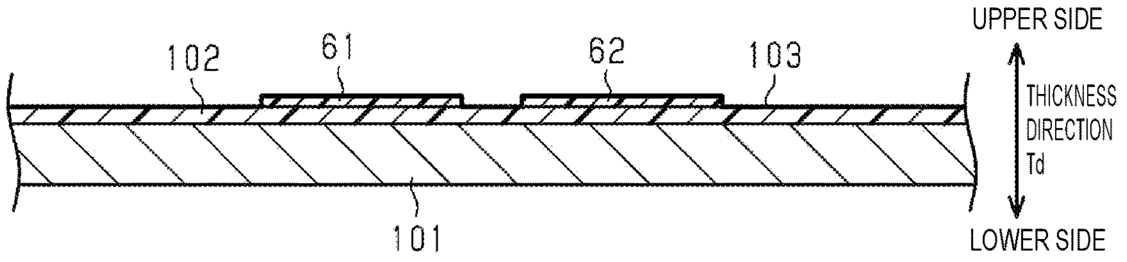
FIG. 6 is an explanatory view of the method for manufacturing the inductor component.

As shown in FIG. 6, a dummy insulating layer 102 is then applied to a whole upper surface of the base member 101. Patterning is then performed by photolithography to form the first insulating resin 61 and the second insulating resin 62 over ranges which are slightly wider than ranges where the first inductor wiring 20 and the second inductor wiring 30 are arranged when viewed from the thickness direction Td.

A seed layer formation process of forming a seed layer 103 is then performed. Specifically, the copper seed layer 103 is formed by sputtering on upper surfaces of the first insulating resin 61, the second insulating resin 62, and the dummy insulating layer 102 from a side with the upper surface of the base member 101. Note that the seed layer 103 is indicated by a bold line in the drawings.

Figure 7:
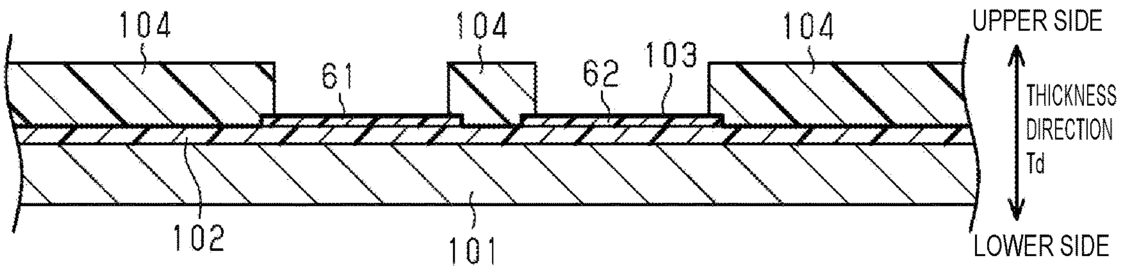
FIG. 7 is an explanatory view of the method for manufacturing the inductor component.

As shown in FIG. 7, a first coating process of forming first coating portions 104 is then performed. Portions, where the first inductor wiring 20, the second inductor wiring 30, the first dummy wiring 41, the second dummy wiring 42, the third dummy wiring 43, and the fourth dummy wiring 44 are not to be formed, of an upper surface of the seed layer 103 are coated with the first coating portions 104. Specifically, a photosensitive dry film resist is first applied to the whole upper surface of the seed layer 103. All of ranges corresponding to the upper surface of the dummy insulating layer 102 and ranges corresponding to upper surfaces of outer edges of the first insulating resin 61 and the second insulating resin 62 of the upper surfaces of the first insulating resin 61 and the second insulating resin 62 are then solidified by being exposed to light. After that, unsolidified portions of the applied dry film resist are peeled off and removed by a chemical solution. With this peeling and removal, solidified portions of the applied dry film resist are formed as the first coating portions 104. On the other hand, the seed layer 103 is exposed at a portion from which the applied dry film resist is removed by the chemical solution and which is not coated with the first coating portion 104. A thickness of the first coating portion 104 which is a dimension in the thickness direction Td of the first coating portion 104 is slightly larger than thicknesses of the first inductor wiring 20 and the second inductor wiring 30 of the inductor component 10 shown in FIG. 3. Note that, since photolithography in other steps (to be described later) is the same process, a detailed description thereof will be omitted.

Figure 8:
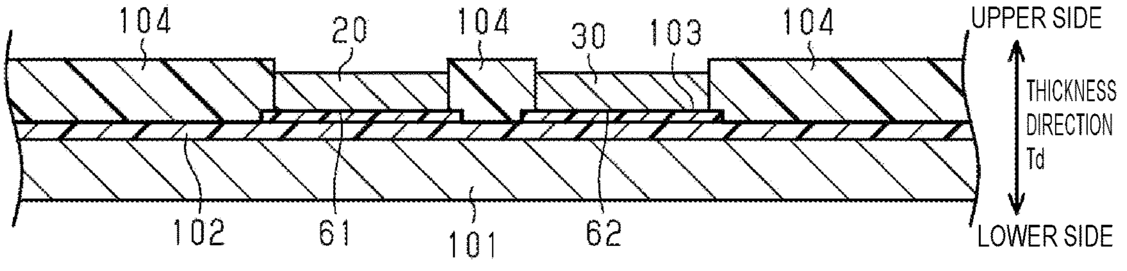
FIG. 8 is an explanatory view of the method for manufacturing the inductor component.

As shown in FIG. 8, an inductor wiring processing process is then performed. In the process, the first inductor wiring 20, the second inductor wiring 30, the first dummy wiring 41, the second dummy wiring 42, the third dummy wiring 43, and the fourth dummy wiring 44 are formed by electrolytic plating at portions which are not coated with the first coating portions 104 of the upper surfaces of the first insulating resin 61 and the second insulating resin 62. Specifically, electrolytic copper plating is performed to grow copper at portions, where the seed layer 103 is exposed, above the upper surfaces of the first insulating resin 61 and the second insulating resin 62. With this growth, the first inductor wiring 20, the second inductor wiring 30, the first dummy wiring 41, the second dummy wiring 42, the third dummy wiring 43, and the fourth dummy wiring 44 are formed. Note that the first inductor wiring 20 and the second inductor wiring 30 are shown in FIG. 8 but the pieces of dummy wiring are not shown.

Figure 9:
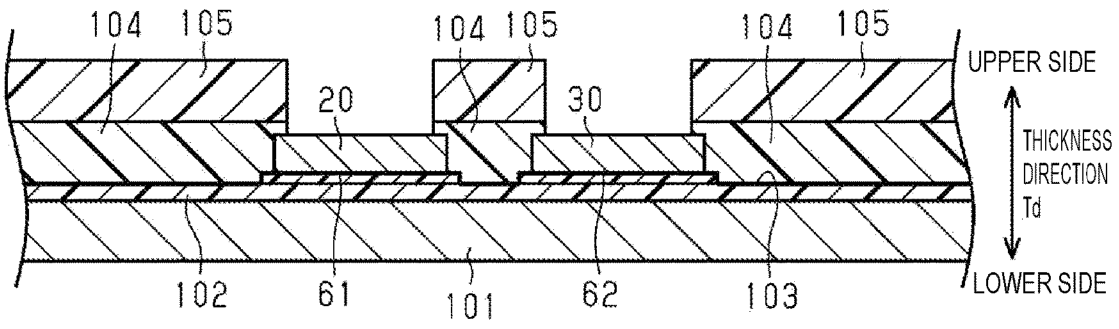
FIG. 9 is an explanatory view of the method for manufacturing the inductor component.

As shown in FIG. 9, a second coating process of forming second coating portions 105 is then performed. Ranges where the second coating portions 105 are to be formed are whole upper surfaces of the first coating portions 104, whole upper surfaces of the pieces of dummy wiring, a range where the first vertical wiring 71 and the second vertical wiring 72 are not to be formed of the upper surface of the first inductor wiring 20, and a range where the third vertical wiring 73 and the fourth vertical wiring 74 are not to be formed of the upper surface of the second inductor wiring 30. The second coating portions 105 are formed over the ranges by photolithography identical to that in the method for forming the first coating portions 104. A dimension in the thickness direction Td of the second coating portion 105 is identical to that of the first coating portion 104.

A vertical wiring processing process of forming pieces of vertical wiring is then performed. Specifically, the first vertical wiring 71, the second vertical wiring 72, the third vertical wiring 73, and the fourth vertical wiring 74 are formed by electrolytic copper plating at portions which are not coated with the second coating portions 105 of the upper surfaces of the first inductor wiring 20 and the second inductor wiring 30. The vertical wiring processing process is set such that an upper end for copper which grows is at a position slightly lower than upper surfaces of the second coating portions 105. Specifically, settings are made such that a dimension in the thickness direction Td of each piece of vertical wiring before cutting (to be described later) is identical to a dimension in the thickness direction Td of each piece of inductor wiring.

Figure 10:
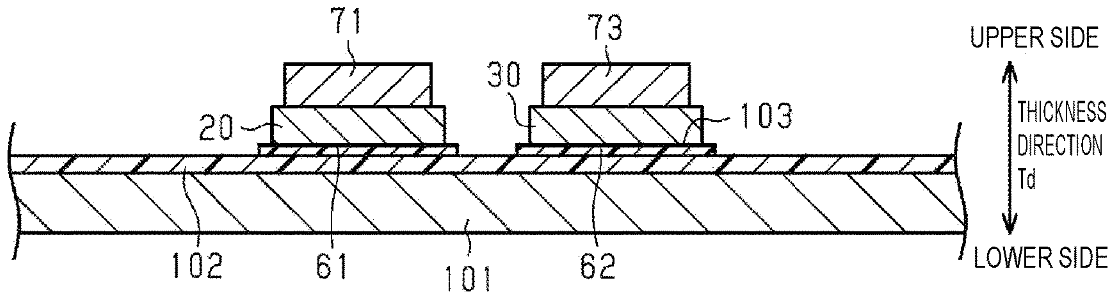
FIG. 10 is an explanatory view of the method for manufacturing the inductor component.

As shown in FIG. 10, a coating portion removal process of removing the first coating portions 104 and the second coating portions 105 is then performed. Specifically, the first coating portions 104 and the second coating portions 105 are peeled off by physically grabbing parts of the first coating portions 104 and the second coating portions 105 and pulling the first coating portions 104 and the second coating portions 105 away from the base member 101. Note that the first vertical wiring 71 and the third vertical wiring 73 are shown in FIG. 10, but the second vertical wiring 72 and the fourth vertical wiring 74 are not shown.

A seed layer etching process of etching the seed layer 103 is then performed. The exposed seed layer 103 is removed by the etching of the seed layer 103. As described above, the pieces of inductor wiring and the pieces of dummy wiring are formed by a semi additive process (SAP).

Figure 11:
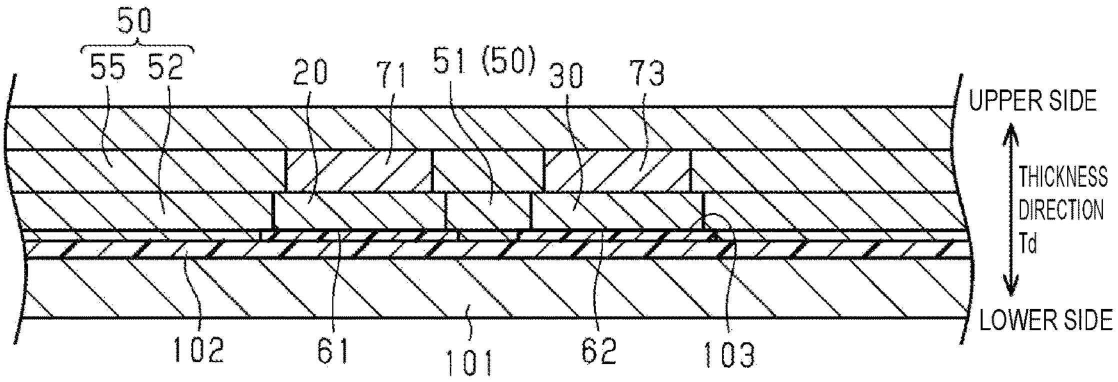
FIG. 11 is an explanatory view of the method for manufacturing the inductor component.

As shown in FIG. 11, a second magnetic layer processing process of stacking the inner magnetic circuit portion 51, the outer magnetic circuit portions 52, the insulating resin magnetic layer 53, and the second magnetic layer 55 is then performed. Specifically, a resin containing magnetic powder which is a material for the magnetic layer 50 is first applied to the side with the upper surface of the base member 101. At this time, the resin containing magnetic powder is applied so as to cover the upper surfaces of the pieces of vertical wiring. The resin containing magnetic powder is then hardened by press working, thereby forming the inner magnetic circuit portion 51, the outer magnetic circuit portions 52, the insulating resin magnetic layer 53, and the second magnetic layer 55 on the side with the upper surface of the base member 101.

Figure 12:
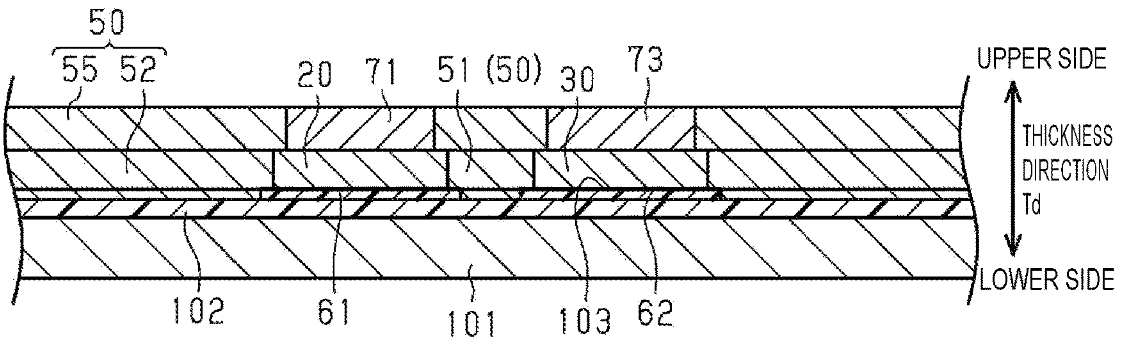
FIG. 12 is an explanatory view of the method for manufacturing the inductor component.

As shown in FIG. 12, an upper portion of the second magnetic layer 55 is then shaven to such an extent that the upper surfaces of the pieces of vertical wiring are exposed. Note that although the inner magnetic circuit portion 51, the outer magnetic circuit portions 52, the insulating resin magnetic layer 53, and the second magnetic layer 55 are integrally formed, the inner magnetic circuit portion 51, the outer magnetic circuit portions 52, the insulating resin magnetic layer 53, and the second magnetic layer 55 are distinctively shown in the drawings.

Figure 13:
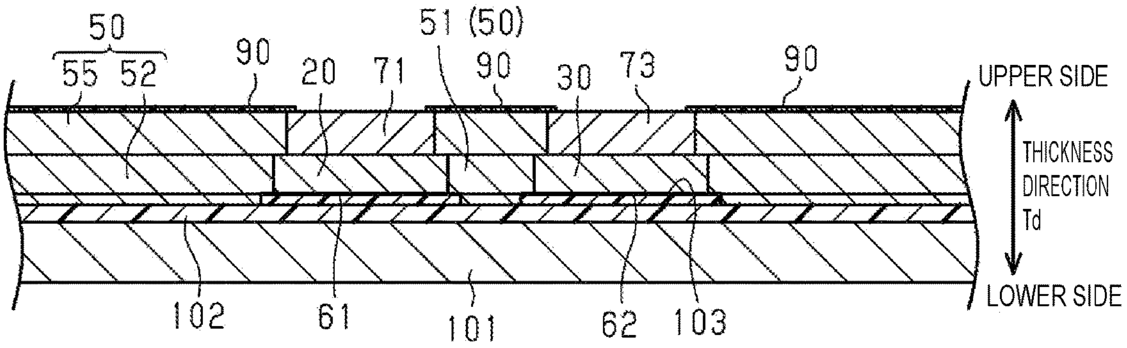
FIG. 13 is an explanatory view of the method for manufacturing the inductor component.

As shown in FIG. 13, an insulating layer processing process is then performed. Specifically, a solder resist to function as the insulating layer 90 is patterned by photolithography at the upper surface of the second magnetic layer 55 and portions where outer terminals are not to be formed of the upper surfaces of the pieces of vertical wiring. Note that, in the present embodiment, a direction orthogonal to the upper surface of the insulating layer 90, that is, the principal surface MF of the body BD is the thickness direction Td.

Figure 14:
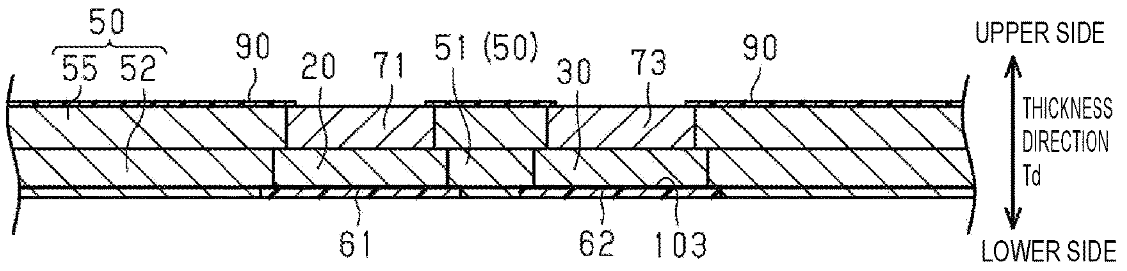
FIG. 14 is an explanatory view of the method for manufacturing the inductor component.

As shown in FIG. 14, a base member cutting process is then performed. Specifically, the base member 101 and the dummy insulating layer 102 are entirely removed by cutting. Note that, although the entire cutting of the dummy insulating layer 102 results in partial removal of lower portions of the insulating resins by cutting, the pieces of inductor wiring are not removed.

Figure 15:
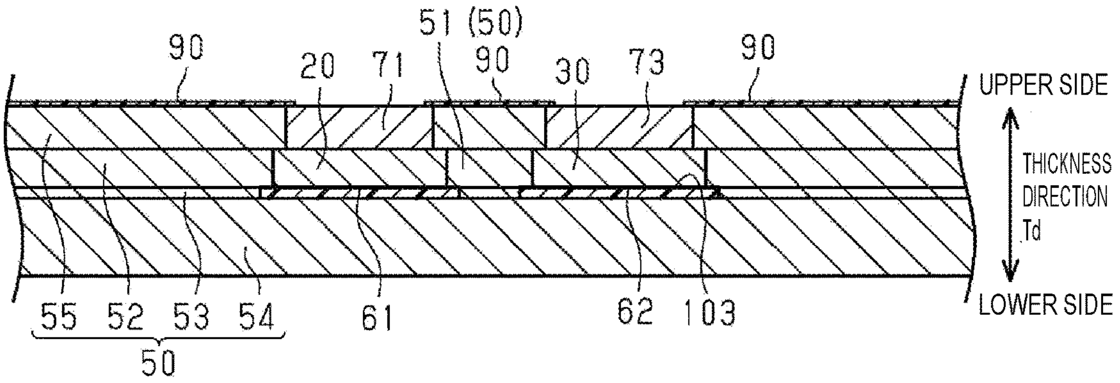
FIG. 15 is an explanatory view of the method for manufacturing the inductor component.

As shown in FIG. 15, a first magnetic layer processing process of stacking the first magnetic layer 54 is then performed. Specifically, a resin containing magnetic powder which is a material for the first magnetic layer 54 is first applied to a lower surface of the base member 101. The resin containing magnetic powder is then hardened by press working, thereby forming the first magnetic layer 54 on the lower surface of the base member 101.

A lower end portion of the first magnetic layer 54 is then shaven. For example, the lower end portion of the first magnetic layer 54 is shaven such that a dimension from the upper surface of each outer terminal to a lower surface of the first magnetic layer 54 has a desired value.

Figure 16:
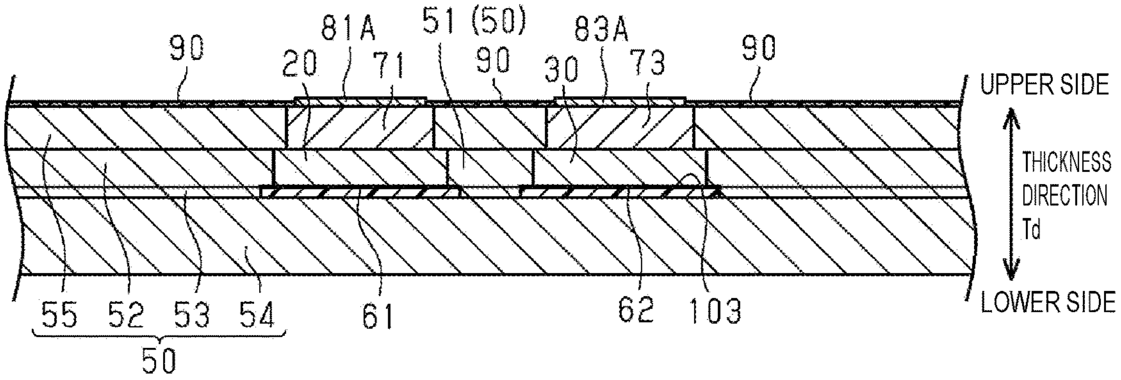
FIG. 16 is an explanatory view of the method for manufacturing the inductor component.

As shown in FIG. 16, an outer terminal processing process is then performed. Specifically, the metal layer 81A of the first outer terminal 81, the metal layer 82A of the second outer terminal 82, the metal layer 83A of the third outer terminal 83, and the metal layer 84A of the fourth outer terminal 84 are formed on portions, which are not covered by the insulating layer 90, of the upper surface of the second magnetic layer 55 and the upper surfaces of the pieces of vertical wiring. The metal layers are formed by performing electroless plating for each of copper, nickel, and gold. With this electroless plating, the metal layer 81A, the metal layer 82A, the metal layer 83A, and the metal layer 84A that each have a structure with three layers are formed. Note that the first outer terminal 81 and the third outer terminal 83 are shown in FIG. 16, but the second outer terminal 82 and the fourth outer terminal 84 are not shown.

Figure 17:
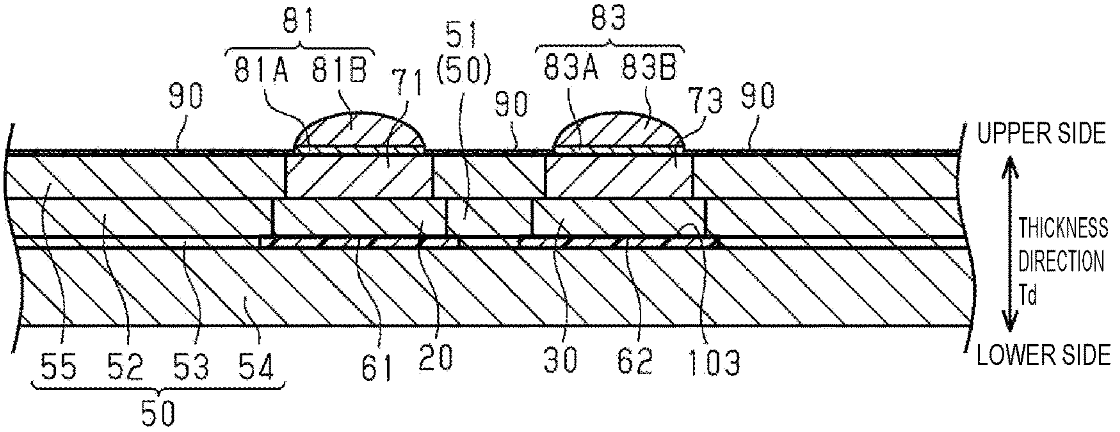
FIG. 17 is an explanatory view of the method for manufacturing the inductor component.

As shown in FIG. 17, the solder portion 81B of the first outer terminal 81, the solder portion 82B of the second outer terminal 82, the solder portion 83B of the third outer terminal 83, and the solder portion 84B of the fourth outer terminal 84 are then formed. Specifically, solder which is a material for the solder portions is applied to portions above the second magnetic layer 55 of upper surfaces of the metal layer 81A, the metal layer 82A, the metal layer 83A, and the metal layer 84A through printing. After that, the solder is melted to flow into a portion above the first vertical wiring 71 of the upper surface of the metal layer 81A. Similarly, the solder is made to flow into a portion above the second vertical wiring 72 of the upper surface of the metal layer 82A, a portion above the third vertical wiring 73 of the upper surface of the metal layer 83A, and a portion above the fourth vertical wiring 74 of the upper surface of the metal layer 84A. The melt solder is cooled, thereby forming the solder portion 81B, the solder portion 82B, the solder portion 83B, and the solder portion 84B. As described above, a shape of each solder portion is formed by heating the solder after application. Specifically, when viewed from the longitudinal direction Ld, a dimension in the thickness direction Td increases toward a middle in the transverse direction Wd of each solder portion. When viewed from the longitudinal direction Ld, a surface on the upper side in the thickness direction Td of each solder portion has a substantially curved shape, a curvature of which decreases toward the upper side in the thickness direction Td. Note that the first outer terminal 81 and the third outer terminal 83 are shown in FIG. 17, but the second outer terminal 82 and the fourth outer terminal 84 are not shown.

Figure 18:
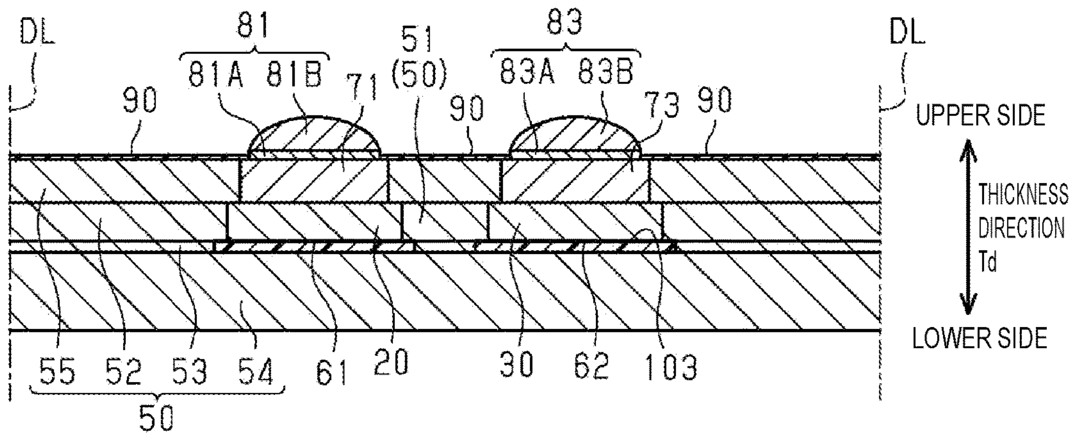
FIG. 18 is an explanatory view of the method for manufacturing the inductor component.

As shown in FIG. 18, a singulation processing process is then performed. Specifically, singulation is performed by dicing using break lines DL. With this singulation, the inductor component 10 can be obtained. In this case, each piece of dummy wiring which is included in the break line DL is also cut, and the dummy wiring is exposed on a side surface of the inductor component 10.

Operation of the above-described embodiment will next be described.

Figure 19:
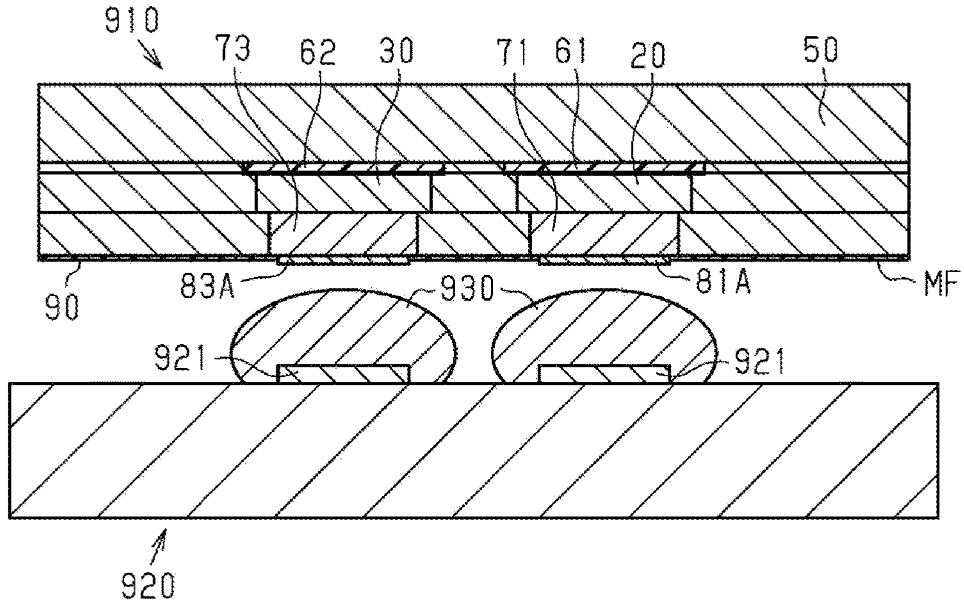
FIG. 19 is an explanatory view of a method for mounting an inductor component according to a comparative example.

Assume that an inductor component 910 according to a comparative example, an outer terminal of which does not include a solder portion, is mounted on a substrate 920. As shown in FIG. 19, the inductor component 910 according to the comparative example is different from the inductor component 10 according to the above-described embodiment only in that each outer terminal does not include a solder portion. That is, a first outer terminal is composed only of the metal layer 81A. A third outer terminal is composed only of the metal layer 83A. The substrate 920 includes substrate-side terminals 921. The substrate-side terminals 921 are exposed on a surface of the substrate 920. A solder 930 is uniformly applied to the substrate-side terminals 921.

Figure 20:
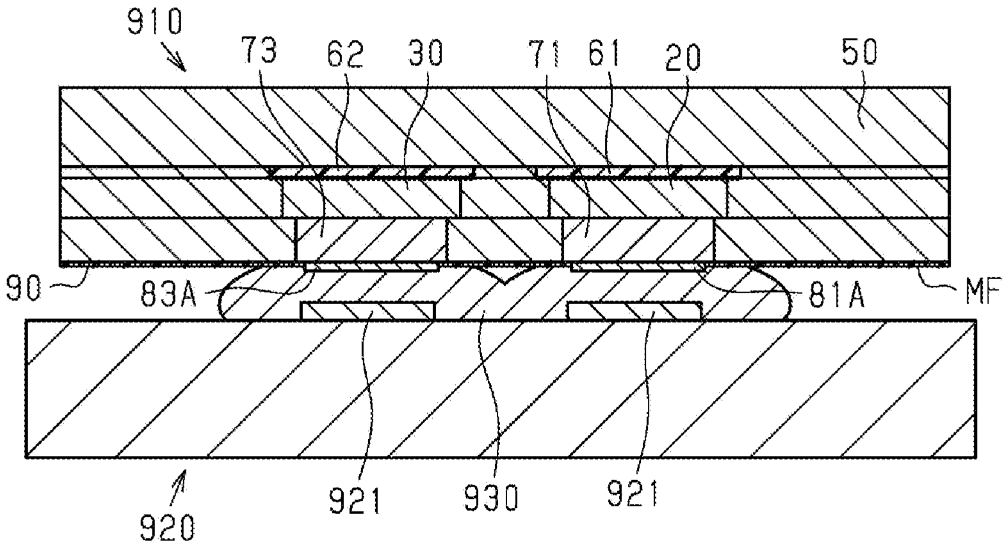
FIG. 20 is an explanatory view of the method for mounting the inductor component according to the comparative example.

The inductor component 910 is then placed on an upper portion of the substrate 920 such that each outer terminal of the inductor component 910 is located at a position of the substrate-side terminal 921. The substrate-side terminals 921 of the substrate 920 and the outer terminals of the inductor component 910 are connected by melting the solder 930 in a reflow furnace. If the amount of solder 930 is excessive at this time, the solder 930 in contact with the metal layer 81A as the first outer terminal and the solder 930 in contact with the metal layer 83A as the third outer terminal may come into contact, as shown in FIG. 20. On the other hand, if the amount of solder 930 is insufficient, fixing strength or electrical continuity may be insufficient due to a small area of contact with each outer terminal at the time of connection of the inductor component 910 to the substrate 920.

Especially in the case of a component with a relatively small dimension in the thickness direction Td, a weight is correspondingly small, and a surface area is relatively large with respect to the dimension in the thickness direction Td. For this reason, slight variations in the amount of solder 930 between terminals are likely to cause the component to be excessively inclined or to rotate and change in orientation. Thus, in the case of such a component with a relatively small dimension in the thickness direction Td, adjustment of the amount of solder 930 is especially difficult.

Figure 21:
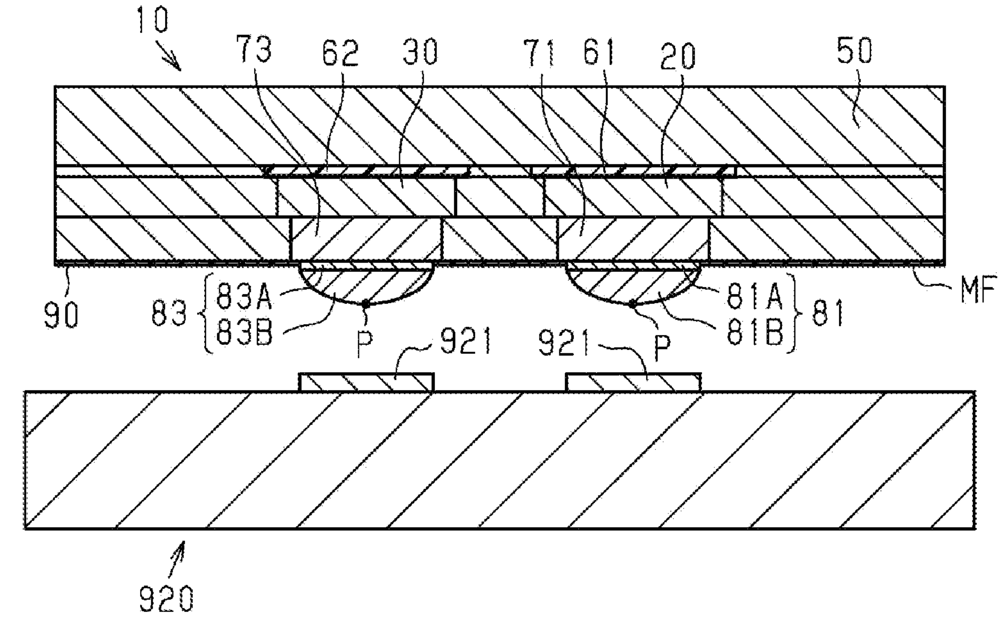
FIG. 21 is an explanatory view of a method for mounting the inductor component.

If the inductor component 10 according to the present embodiment is mounted on the substrate 920, a portion of the first outer terminal 81 of the inductor component 10 which includes the protruding distal end P is the solder portion 81B, as shown in FIG. 21. A portion of the third outer terminal 83 which includes the protruding distal end P is the solder portion 83B. Amounts for the solder portion 81B and the solder portion 83B are adjusted so as to suit the inductor component 10. It is thus possible to save the need to apply solder to the substrate-side terminal 921 of the substrate 920 as in the comparative example or reduce the amount of adjustment of solder 930 to be applied to the substrate 920.

Figure 22:
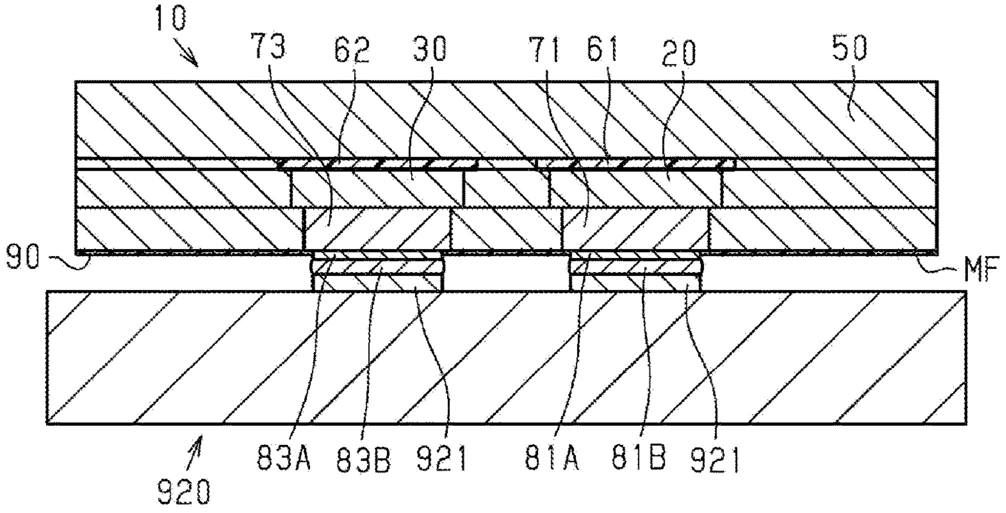
FIG. 22 is an explanatory view of the method for mounting the inductor component.

As shown in FIG. 22, the inductor component 10 is then placed on the upper portion of the substrate 920 such that the first outer terminal 81 and the third outer terminal 83 of the inductor component 10 are located at the positions of the substrate-side terminals 921. The substrate-side terminals 921 of the substrate 920 and the inductor component 10 are connected by melting the solder portion 81B and the solder portion 83B in the reflow furnace.

Effects of the inductor component 10 according to the above-described embodiment will next be described. Note that although, in the following description, a description of the first outer terminal 81 will be given, and a description of the other outer terminals will be omitted, the other outer terminals have the same effects.

(1) According to the above-described first embodiment, the upper portion, including the protruding distal end P, of the first outer terminal 81 of the inductor component 10 is a solder portion. This eliminates the need to apply solder to the substrate-side terminals 921 of the substrate 920. It is possible to inhibit the amount of solder with respect to the inductor component 10 from becoming excessive or insufficient due to application of the solder 930 to the substrate 920.

In a case where the solder 930 is uniformly applied to the substrate-side terminals 921 of the substrate 920, it is difficult to tailor the amount of solder to the type and size of a component to be mounted on the substrate-side terminal 921 and apply solder. Since the upper portion, including the protruding distal end P, of the first outer terminal 81 of the inductor component 10 is the solder portion 81B in the present embodiment, solder, the amount of which is suitable for the inductor component 10, can be formed as the solder portion 81B.

(2) According to the first embodiment, the first vertical wiring 71 and the second vertical wiring 72 are directly connected to the first inductor wiring 20 and the second inductor wiring 30. For this reason, the first inductor wiring 20 and the second inductor wiring 30 are composed only of the single layer of the first layer L1. Also, the first layer L1 is parallel to the principal surface MF of the body BD, from which the first outer terminal 81 protrudes. It is thus possible to contribute to a reduction in a dimension in the thickness direction Td of the inductor component 10.

(3) According to the first embodiment, the material for the magnetic layer 50 is a resin composite containing metal magnetic powder made of an iron-silica alloy or an amorphous alloy. For this reason, inductance achievement efficiency of the inductor component 10 can be improved. Also, DC superposition characteristics of the inductor component 10 can be improved. Since a magnetic circuit need not be excessively thickened, a dimension in the thickness direction Td of the magnetic layer 50 can be correspondingly reduced. As a result, the dimension in the thickness direction Td of the inductor component 10 can be reduced.

(4) According to the first embodiment, the distance TP in the thickness direction Td from the upper surface of the insulating layer 90, that is, the principal surface MF to the protruding distal end P of the first outer terminal 81 is less than about one-half of the dimension TBD in the thickness direction Td of the body BD. For this reason, the dimension in the thickness direction Td of the whole inductor component 10 can be inhibited from becoming excessively large. Also, the dimension TS in the thickness direction Td of the solder portion 81B is not less than about one-tenth of the dimension TBD in the thickness direction Td of the body BD. It is thus possible to secure solder, the amount of which is sufficient to mount the inductor component 10 on the substrate 920.

(5) According to the first embodiment, when viewed from the thickness direction Td, an area of a range occupied by the first outer terminal 81 is larger than the area of the range, which is exposed without being obstructed by the principal surface MF, of the first vertical wiring 71. For this reason, connection can be strengthened when the solder portion 81B is melt and connected to the substrate 920, as compared to a case where solder is provided only at the portion, which is exposed without being obstructed by the principal surface MF, of the upper surface of the vertical wiring. Since an area over which the solder portion 81B spreads can be increased, it is possible to secure a solder amount while limiting the amount of protrusion.

(6) According to the first embodiment, when viewed from the thickness direction Td, the geometric center CE1 of the solder portion 81B deviates from the geometric center CV1 of the first vertical wiring 71 that the solder portion 81B is in contact with. For this reason, even if a positional relationship among the pieces of vertical wiring and a positional relationship among the substrate-side terminals 921 of the substrate 920 are somewhat different, each solder portion 81B can be connected to the substrate 920 by adjusting a position of the solder portion 81B. Thus, the degree of freedom of pattern layout of the substrate-side terminals 921 of the substrate 920 increases.

(7) According to the first embodiment, when viewed from the thickness direction Td, the geometric center CE1 of the solder portion 81B deviates from the geometric center CV1 of the first vertical wiring 71. On the other hand, the geometric center CE1 of the solder portion 81B falls within the range occupied by the first vertical wiring 71. For this reason, the solder portion 81B can be inhibited from deviating excessively from the first vertical wiring 71. It is thus possible to inhibit the amount of first outer terminal 81 between the first vertical wiring 71 and the substrate 920 from becoming excessively large due to excessive deviation of the position of the solder portion 81B from the first vertical wiring 71 when viewed from the thickness direction Td. As a result, losses due to a flow of current in the first outer terminal 81 can be limited.

(8) According to the first embodiment, the dimension DL1 in the longitudinal direction Ld of the solder portion 81B is larger than the dimension DS1 in the transverse direction Wd of the solder portion 81B. Also, the dimension DL1 in the longitudinal direction Ld of the solder portion 81B is larger than the dimension DV1 in the longitudinal direction Ld of the first vertical wiring 71. That is, the shape of the solder portion 81B has anisotropy. This makes it possible to inhibit the solder portion 81B from being short-circuited to the third outer terminal 83 without making the dimension DS1 in the transverse direction Wd excessively large. Meanwhile, a surface area of the solder portion 81B can be increased by making the dimension DL1 in the longitudinal direction Ld larger than the first vertical wiring 71. Thus, at the time of mounting of the inductor component 10 on the substrate 920 or the like, the solder portion 81B can be brought into solid contact with the substrate-side terminal 921 of the substrate 920.

(9) According to the first embodiment, the difference between the first angle θ1 and the second angle θ2 is about 1 degree. That is, since the second angle θ2 is larger than the first angle θ1, the protruding distal end P is closer to a middle of the inductor component 10 when viewed from the thickness direction Td. After mounting of the inductor component 10, it is difficult to check whether the inductor component 10 is appropriately mounted at a portion near the middle, when viewed from the thickness direction Td. According to the first embodiment, fixing strength and electrical continuity can be secured in a portion difficult to check after mounting. According to the first embodiment, the difference between the first angle θ1 and the second angle θ2 is small. For this reason, when viewed from the thickness direction Td, the position of the protruding distal end P of the first outer terminal 81 is not excessively away from the geometric center CE1 of the first outer terminal 81, and the solder portion 81B is located generally at a middle of the first outer terminal 81. It is thus possible to inhibit the melt solder portion 81B from flowing lopsidedly in the longitudinal direction Ld at the time of mounting the inductor component 10 on the substrate 920.

(10) According to the first embodiment, since the first angle θ1 is about 14 degrees, the first angle θ1 is not less than about 10 degrees and less than about 30 degrees (i.e., from about 10 degrees to less than about 30 degrees). Since the second angle θ2 is about 15 degrees, the second angle θ2 is not less than about 10 degrees and less than about 30 degrees (i.e., from about 10 degrees to less than about 30 degrees). Since the first angle θ1 and the second angle θ2 are not excessively large, the dimension TS in the thickness direction Td of the solder portion 81B has a corresponding magnitude. It is thus possible to inhibit the amount of solder portion 81B from becoming excessive large.

(11) According to the first embodiment, when viewed from the transverse direction Wd, the dimension in the thickness direction Td increases toward the middle in the longitudinal direction Ld of the solder portion 81B. When viewed from the transverse direction Wd, the surface on the upper side in the thickness direction Td of the solder portion 81B has the substantially curved shape, the curvature of which decreases toward the upper side in the thickness direction Td. With this substantially curved shape, the dimension TS in the thickness direction Td of the solder portion 81B can be reduced with the solder portion 81B protruding to some extent. It is also possible to inhibit the solder portion 81B from protruding from an end of the metal layer when the solder portion 81B is melt.

(12) According to the first embodiment, when viewed from the thickness direction Td, the number of voids 81C contained in the portion above the first vertical wiring 71 of the solder portion 81B is smaller than the number of voids 81C contained in the portion above the second magnetic layer 55. The voids 81C contained in the portion above the second magnetic layer 55 of the solder portion 81B allow a reduction in residual stress at the time of formation of the solder portion 81B. Current flows mainly in the portion above the first vertical wiring 71 of the solder portion 81B. Since the number of voids 81C contained in the portion is small, the voids 81C are unlikely to block a flow of current from the first vertical wiring 71 to the solder portion 81B.

(13) According to the first embodiment, the first outer terminal 81 has the metal layer 81A and the solder portion 81B. The provision of the metal layer 81A makes it possible to set the position of the protruding distal end P of the first outer terminal 81 at a position at a distance larger than the dimension in the thickness direction Td of the solder portion 81B from the principal surface MF.

(14) According to the first embodiment, the distance from the upper surface of the metal layer 81A to the protruding distal end P of the first outer terminal 81 is larger than the distance from the upper surface of the first vertical wiring 71 to the upper surface of the metal layer 81A. In other words, the dimension TS in the thickness direction Td of the solder portion 81B is larger than the dimension TM in the thickness direction Td of the metal layer 81A. As described above, the size of the whole first outer terminal 81 can be increased by increasing the dimension TS in the thickness direction Td of the solder portion 81B of the first outer terminal 81.

(15) According to the first embodiment, the first outer terminal 81 protrudes from the principal surface MF toward the upper side in the thickness direction Td. For this reason, at the time of mounting the inductor component 10 on the substrate 920, the first outer terminal 81 protruding from the principal surface MF comes into contact with the substrate 920. Thus, it is easy to mount the inductor component 10 without interference of the principal surface MF with the substrate 920.

The above-described embodiment can be changed in the following manners and be carried out. The embodiment and the following modifications can be carried out in combination within a technically consistent range.

In the above-described embodiment, the configuration of the first outer terminal 81 is not limited to the example in the embodiment. For example, the first outer terminal 81 may be composed only of the solder portion 81B. For example, the metal layer 81A of the first outer terminal 81 may be configured to have a structure with two layers or a structure with four or more layers. The only requirement is that at least part, including the protruding distal end P, of the first outer terminal 81 is the solder portion 81B. In an example shown in FIG. 23, in an inductor component 110, a first outer terminal 181 is composed of a nickel layer 181A, a copper layer 181B, and a solder portion 181C. An upper surface of the first vertical wiring 71 is covered by the nickel layer 181A. The nickel layer 181A has a substantially thin film shape. The copper layer 181B is connected to an upper surface of the nickel layer 181A. The copper layer 181B has a substantially quadrangular prism shape and extends in a thickness direction Td. The nickel layer 181A and the copper layer 181B constitute a metal layer. The solder portion 181C is connected to an upper surface of the copper layer 181B. A dimension in the thickness direction Td of the copper layer 181B is larger than a dimension in the thickness direction Td of the nickel layer 181A and a dimension in the thickness direction Td of the solder portion 181C. Note that, in this modification, a third outer terminal 183 is composed of a nickel layer 183A, a copper layer 183B, and a solder portion 183C, like the first outer terminal 181.

As described above, if the dimension in the thickness direction Td of the copper layer 181B is not less than the dimension in the thickness direction Td of the solder portion 181C, that is, the distance from the upper surface of the copper layer 181B to a protruding distal end P of the first outer terminal 181, a dimension in the thickness direction Td of the first outer terminal 181 can be increased by increasing the dimension in the thickness direction Td of the copper layer 181B.

Figure 23:
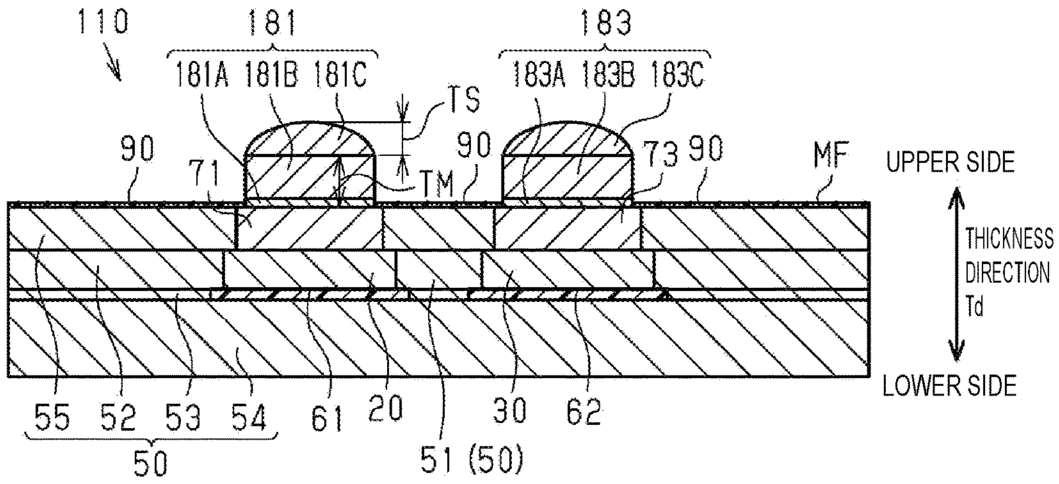
FIG. 23 is a sectional view of an inductor component.

In the example shown in FIG. 23, a dimension TS in the thickness direction Td of the solder portion 181C, that is, a distance from the upper surface of the copper layer 181B to the protruding distal end P of the first outer terminal 181 is less than a dimension TM in the thickness direction Td of the nickel layer 181A and the copper layer 181B that are metal layers, that is, a distance from the upper surface of the first vertical wiring 71 to the upper surface of the copper layer 181B. Since the proportion of the metal layers to the dimension in the thickness direction Td of the first outer terminal 181 is not less than about one-half, it is possible to inhibit the amount of solder portion 181C from becoming excessively large.

Note that, regarding a method for forming the copper layer 181B, the copper layer 181B may be formed by arranging a column-shaped member made of copper which is prepared in advance. Alternatively, a SAP capable of forming high-aspect wiring such that the wiring has a section large in the thickness direction Td may be used. Additionally, the copper layer 181B may be formed by stacking a plurality of layers by a plurality of repetitions of a SAP.

Figure 24:
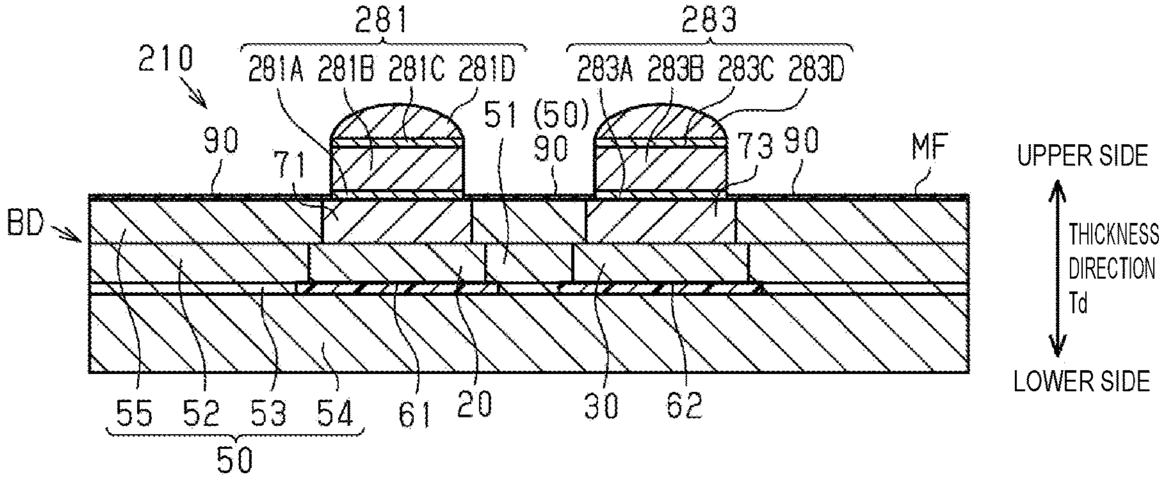
FIG. 24 is a sectional view of an inductor component.

In an example shown in FIG. 24, in an inductor component 210, a first outer terminal 281 has a first nickel layer 281A, a copper layer 281B, and a second nickel layer 281C as metal layers. The first outer terminal 281 also has a solder portion 281D. An upper surface of the first vertical wiring 71 is covered by the first nickel layer 281A. The first nickel layer 281A has a substantially thin film shape. The copper layer 281B is connected to an upper surface of the first nickel layer 281A. The copper layer 281B has a substantially quadrangular prism shape and extends in a thickness direction Td. The second nickel layer 281C is connected to an upper surface of the copper layer 281B. The first nickel layer 281A, the copper layer 281B, and the second nickel layer 281C constitute a metal layer. The solder portion 281D is connected to an upper surface of the second nickel layer 281C. The presence of the first nickel layer 281A and the second nickel layer 281C allows inhibition of electromigration. Note that, in this modification, a third outer terminal 283 is composed of a first nickel layer 283A, a copper layer 283B, a second nickel layer 283C, and a solder portion 283D, like the first outer terminal 281.

In the above-described embodiment, the shape of the metal layer 81A is not limited to the example in the embodiment. For example, in an example shown in FIG. 25, in an inductor component 310, a first outer terminal 381 is composed of a metal layer 381A and a solder portion 381B. A dimension in a transverse direction Wd of the metal layer 381A is larger than a dimension in the transverse direction Wd of the first vertical wiring 71. An upper surface of the metal layer 381A includes a portion which has a planar shape and a portion which has a non-planar shape. Specifically, when viewed from an upper side in a thickness direction Td, the whole portion except for a middle of the metal layer 381A has a planar shape, and a middle portion is recessed from an upper end face toward a lower side in the thickness direction Td. The solder portion 381B is connected to the upper surface of the metal layer 381A. Note that, in this modification, a third outer terminal 383 is composed of a metal layer 383A and a solder portion 383B, like the first outer terminal 381. As described above, if a surface of the metal layer 381A includes the non-planar-shaped portion, an area of contact between the metal layer 381A and the solder portion 381B increases. For this reason, even if the inductor component 310 is connected to the substrate 920, the metal layer 381A and the solder portion 381B are more firmly connected. Additionally, since the solder portion 381B is self-aligned with a position of the recess in the metal layer 381A at the time of formation of the solder portion 381B, the accuracy of a position where the solder portion 381B is to be formed can be improved.

Figure 26:
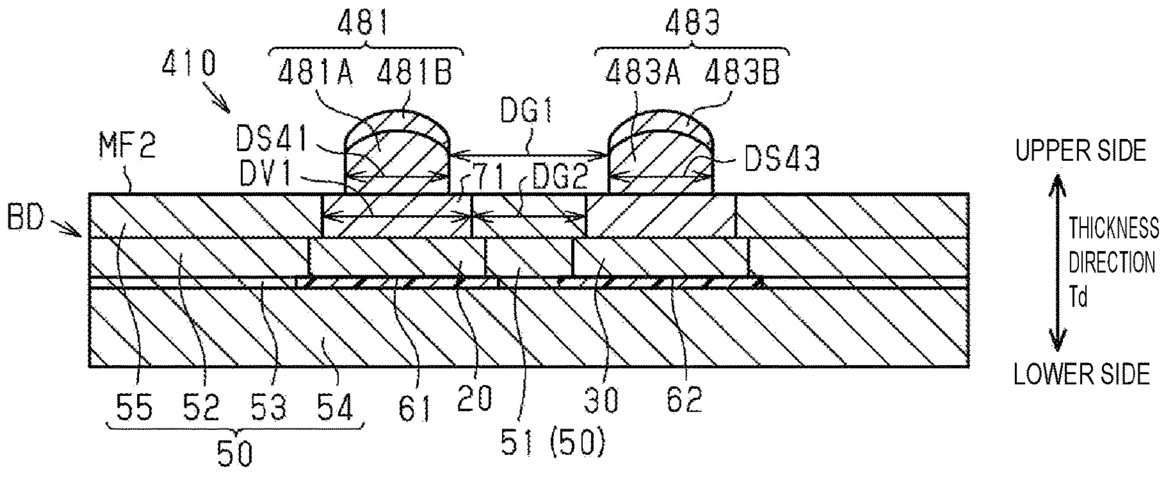
FIG. 26 is a sectional view of an inductor component.

For example, in an example shown in FIG. 26, in an inductor component 410, a surface of a metal layer 481A of a first outer terminal 481 has a substantially convex shape which is convex upward when viewed from a longitudinal direction Ld.

Figure 25:
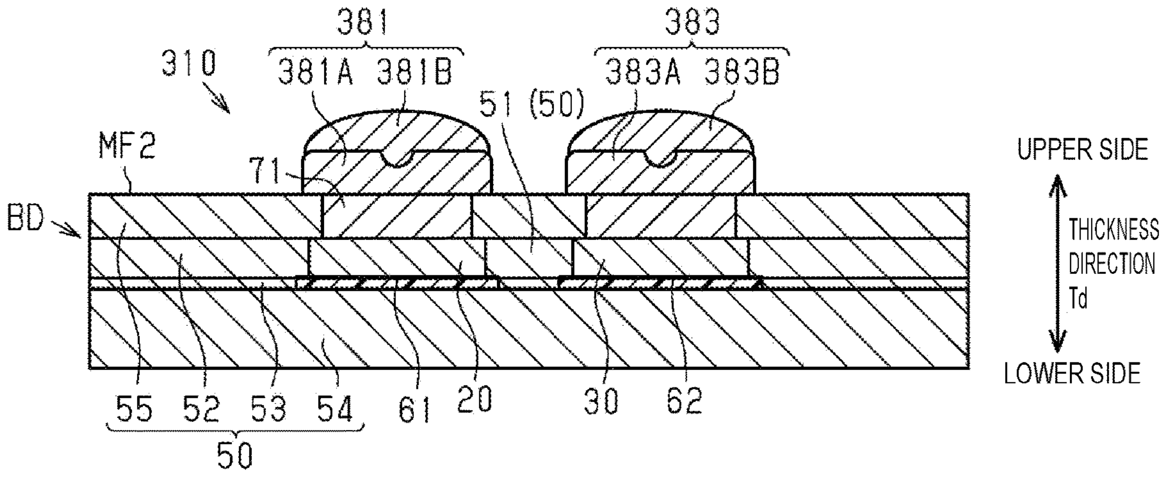
FIG. 25 is a sectional view of an inductor component.

Note that, in each of the above-described modifications shown in FIGS. 25 and 26, the insulating layer 90 is omitted in the inductor component 310 or 410. In this case, a principal surface MF2 of a body BD serves as an upper surface of the second magnetic layer 55. In the example shown in FIG. 26, since the surface of the metal layer 481A has the substantially convex shape that is convex upward when viewed from the longitudinal direction Ld, even if the amount of solder portion 481B is correspondingly small, a portion where the first outer terminal 481 protrudes from the principal surface MF2 can be secured. For this reason, leakage of current between terminals can be inhibited even without the insulating layer 90. Note that a third outer terminal 483 is composed of a metal layer 483A and a solder portion 483B, like the first outer terminal 481.

In the example shown in FIG. 26, a dimension DS41 in a transverse direction Wd of the first outer terminal 481 is smaller than the example in the above-described embodiment. Similarly, a dimension DS43 in the transverse direction Wd of the third outer terminal 483 is smaller than the example in the embodiment. For this reason, when viewed from a thickness direction Td, a dimension DG1 of a gap between the first outer terminal 481 and the third outer terminal 483 is larger than a dimension DG2 of a gap between the first vertical wiring 71 and the third vertical wiring 73. Additionally, when viewed from the thickness direction Td, the dimension DG1 of the gap between the first outer terminal 481 and the third outer terminal 483 is smaller than a minimum dimension which passes through a geometric center CE1 of the first outer terminal 481, that is, a dimension DV1 of one side of a substantially square shape. For this reason, the first outer terminal 481 and the third outer terminal 483 are arranged correspondingly away from each other. It is thus possible to more effectively inhibit the first outer terminal 481 and the third outer terminal 483 from being short-circuited even if the solder portion 481B and the solder portion 483B are melt.

In the above-described embodiment, the shape of each outer terminal is not limited to the example in the embodiment. For example, the upper surface of the first outer terminal 81 may have a substantially planar shape. In this case, the solder portion 81B larger in amount can be provided at a position away from the principal surface MF.

Figure 27:
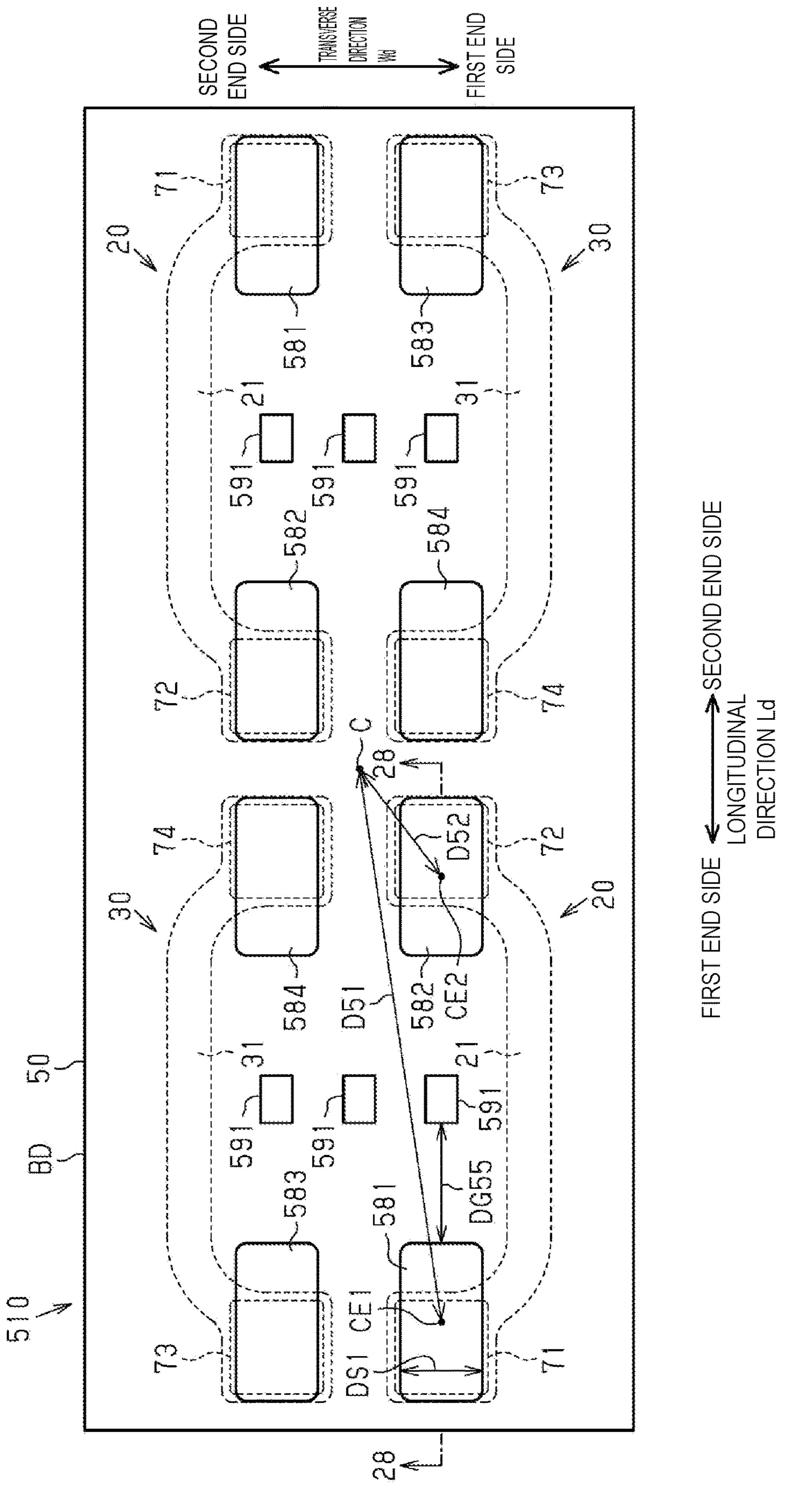
FIG. 27 is a top view of an inductor component.
Figure 28:
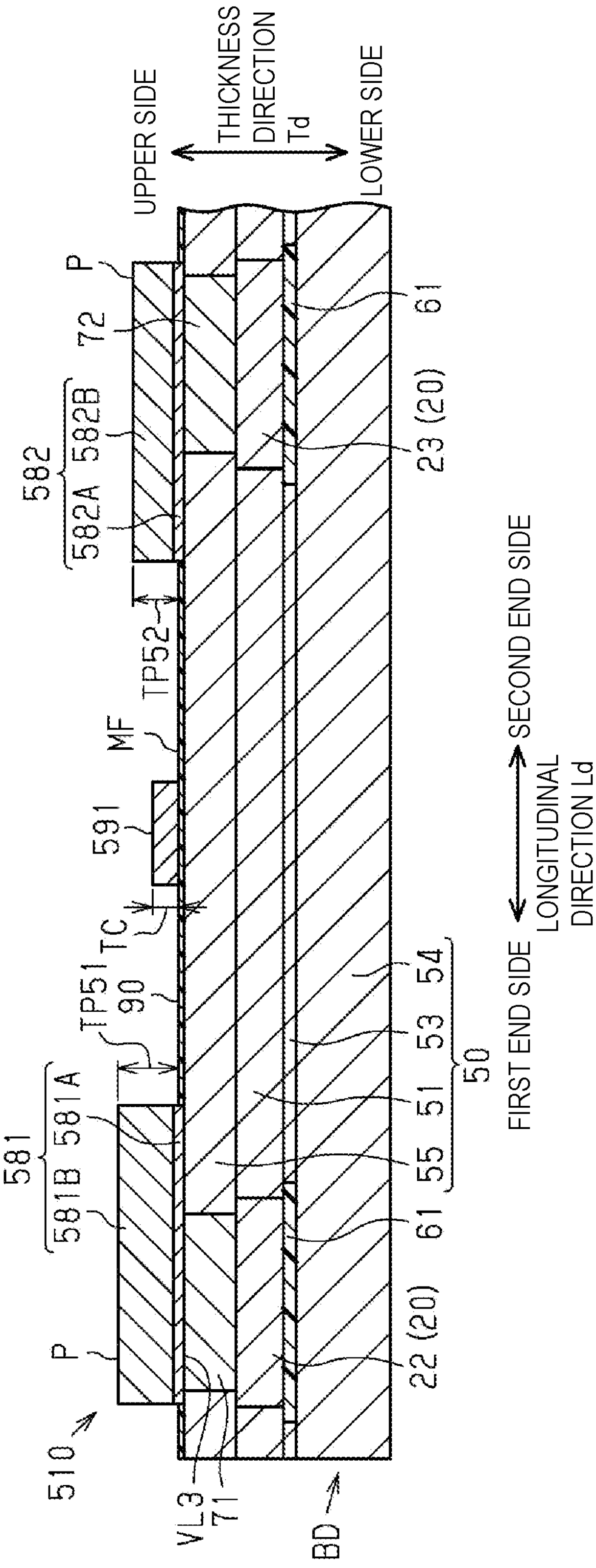
FIG. 28 is a sectional view of the inductor component taken along line 28-28 in FIG. 27.

In an example shown in FIG. 27, an inductor component 510 is an inductor component which includes two inductor components 10 according to the above-described embodiment. Specifically, when viewed from a thickness direction Td, the first inductor wiring 20 and the second inductor wiring 30 in a first group are arranged closer to a first end side in a longitudinal direction Ld than is a geometric center C of the inductor component 510. The first inductor wiring 20 and the second inductor wiring 30 in a second group are arranged at positions, on which the first inductor wiring 20 and the second inductor wiring 30 in the first group fall when rotated by 180 degrees around the geometric center C. For this reason, the second inductor wiring 30 in the second group is arranged on a second end side in the longitudinal direction Ld of the first inductor wiring 20 in the first group. The first inductor wiring 20 in the second group is arranged on the second end side in the longitudinal direction Ld of the second inductor wiring 30 in the first group. Note that pieces of dummy wiring are omitted. In the first inductor wiring 20 in the first group, when viewed from the thickness direction Td, a distance D51 between the geometric center C of the inductor component 510 and a geometric center CE1 of a first outer terminal 581 is larger than a distance D52 between the geometric center C of the inductor component 510 and a geometric center CE2 of a second outer terminal 582. As shown in FIG. 28, a protruding distal end P of the first outer terminal 581 is located closer to an upper side in the thickness direction Td than is a protruding distal end P of the second outer terminal 582. That is, a distance TP51 in the thickness direction Td from a principal surface MF to the protruding distal end P of the first outer terminal 581 is larger than a distance TP52 in the thickness direction Td from the principal surface MF to the protruding distal end P of the second outer terminal 582. Note that although not shown, a protruding distal end of a third outer terminal 583 is also located closer to the upper side in the thickness direction Td than is a protruding distal end of a fourth outer terminal 584.

When the inductor component 510 is mounted on the substrate 920 in the above-described example, the inductor component 510 may warp in the thickness direction Td. The amount of warp can increase away from the geometric center C of the body BD of the inductor component 510 when viewed from the thickness direction Td. Even in such a case, the first outer terminal 581 that is away from the geometric center C of the body BD when viewed from the thickness direction Td protrudes farther from the principal surface MF than the second outer terminal 582 that is close to the geometric center C of the body BD. Thus, it is easy to bring the protruding distal end P of each outer terminal into contact with the substrate 920 when the inductor component 510 warps in the thickness direction Td.

In the above-described example, the first outer terminal 581 is composed of a layered metal layer 581A and a layered solder portion 581B, as shown in FIG. 28. Since an upper surface of the solder portion 581B serves as the protruding distal end P of the first outer terminal 581, the protruding distal end P of the first outer terminal 581 is substantially planar. Similarly, the second outer terminal 582 is composed of a layered metal layer 582A and a layered solder portion 582B. Since an upper surface of the solder portion 582B serves as the protruding distal end P of the second outer terminal 582, the protruding distal end P of the second outer terminal 582 is substantially planar. If the protruding distal ends P are made substantially planar when the distances in the thickness direction Td from the principal surface MF to the protruding distal ends P of the outer terminals are different, adjustment is easily performed by shaving a protruding side of an outer terminal, the amount of protrusion for which is set to be smaller.

In the example shown in FIG. 27, a conductive portion 591 which is different from the outer terminals is provided between the first outer terminal 581 and the second outer terminal 582 in the longitudinal direction Ld on the principal surface MF of the body BD. Provision of a plurality of conductive portions 591 increases spots higher in thermal conductivity than the magnetic layer 50 and facilitates heat dissipation. Additionally, an increase in a surface area of the inductor component 510 facilitates heat dissipation. In this modification, three conductive portions 591 are lined up in a transverse direction Wd, and a total of six conductive portions 591 are attached. The conductive portions 591 located at ends of each set of three lined-up conductive portions 591 coincide in a position in the transverse direction Wd with the outer terminals. The conductive portion 591 has a substantially rectangular parallelepiped shape. As shown in FIG. 28, a dimension TC in the thickness direction Td of the conductive portion 591, that is, a distance from the principal surface MF to an upper surface of the conductive portion 591 is smaller than the distance TP51 in the thickness direction Td from the principal surface MF to the protruding distal end P of the first outer terminal 581. As shown in FIG. 27, when viewed from the thickness direction Td, a minimum dimension DG55 of a gap between the first outer terminal 581 and the conductive portion 591 is larger than a minimum dimension of the first outer terminal 581 which passes through the geometric center CE1 of the first outer terminal 581, that is, a dimension DS1 in the transverse direction Wd of the first outer terminal 581. For this reason, the outer terminals and the conductive portions 591 are arranged correspondingly away from each other. It is thus possible to inhibit the outer terminals from being short-circuited through the conductive portions even if each solder portion is melt.

In the above-described embodiment, the configuration of the body BD is not limited to the example in the embodiment. For example, the insulating layer 90 may be omitted as in the examples shown in FIGS. 25 and 26 or the first insulating resin 61 and the second insulating resin 62 may be omitted. The only requirement is that the first inductor wiring 20 and the second inductor wiring 30 are arranged inside the body BD. For this reason, the materials for the body BD are not limited to those in the embodiment and may be all resins or non-magnetic materials, and a sintered compact of ferrite, glass, alumina, or the like may be used. For example, of the body BD, the insulating resin magnetic layer 53 and the first magnetic layer 54 may be made of non-magnetic materials. In this case, it is easy to ensure insulation on the lower side in the thickness direction Td of each piece of inductor wiring. Note that, if the magnetic layer 50 made of a magnetic material is included in the body BD, a corresponding inductance value is easily secured. Especially if the first magnetic layer 54 and the second magnetic layer 55 are stacked so as to hold the pieces of inductor wiring from both sides in the thickness direction Td, magnetic flux leakage is easily prevented, and a corresponding inductance value can be achieved.

In the above-described embodiment, the first inductor wiring 20 and the second inductor wiring 30 only have to give inductance to the inductor component 10 by generating magnetic flux in a magnetic layer if current flows.

In the above-described embodiment, the shape of each piece of inductor wiring is not limited to the example in the embodiment. For example, the first inductor wiring 20 may have a substantially curved shape with not less than 1.0 turns or a substantially linear shape with 0 turns. Additionally, the first inductor wiring 20 and the second inductor wiring 30 may have different shapes. Alternatively, each piece of inductor wiring may have a substantially meander shape. Alternatively, for example, the first inductor wiring 20 and the second inductor wiring 30 may extend over a plurality of layers parallel to the principal surface MF.

In the above-described embodiment, the first wiring body 21 of the first inductor wiring 20, the pads, and the pieces of dummy wiring need not necessarily be integral and may be separate members.

When viewed from the thickness direction Td, each pad may be arranged to deviate from the geometric center of the vertical wiring.

In the above-described embodiment, the number of pieces of inductor wiring is not limited to the example in the embodiment. For example, the number of pieces of inductor wiring may be four in total as in the modification shown in FIG. 27 or may be only one.

In the above-described embodiment, a structure of each piece of inductor wiring is not limited to the example in the embodiment. For example, the first pad 22 and the second pad 23 may be omitted in the first inductor wiring 20, and the shapes of the first pad 22 and the second pad 23 are not limited to the examples in the embodiment. For example, the shapes of the first pad 22 and the second pad 23 may be substantially circular or substantially polygonal when viewed from the thickness direction Td.

In the above-described embodiment, the composition of each piece of inductor wiring is not limited to the example in the embodiment. For example, the inductor wiring may be composed of silver or gold.

In the above-described embodiment, the composition of the magnetic layer 50 is not limited to the example in the embodiment. For example, the material for the magnetic layer 50 may be ferrite powder or a mixture of ferrite powder and metal magnetic powder.

In the above-described embodiment, the first vertical wiring 71 need not extend only in the direction orthogonal to the principal surface ME The first vertical wiring 71 may extend in a direction other than the direction orthogonal to the principal surface ME For example, the first vertical wiring 71 may be inclined with respect to the thickness direction Td as long as the first vertical wiring 71 extends through the second magnetic layer 55. The same applies to the second vertical wiring 72, the third vertical wiring 73, and the fourth vertical wiring 74.

In the above-described embodiment, the first vertical wiring 71 may be connected to the first pad 22 through a via. The same applies to the second vertical wiring 72, the third vertical wiring 73, and the fourth vertical wiring 74.

In the above-described embodiment, an amount, by which the first outer terminal 81 protrudes from the principal surface MF, is not limited to the example in the embodiment. The larger the distance TP in the thickness direction Td from the principal surface MF to the protruding distal end P of the first outer terminal 81 is, the larger is a distance which can be secured between the principal surface MF and the substrate 920 at the time of mounting the inductor component 10 to the substrate 920. On the other hand, the smaller the distance TP in the thickness direction Td from the principal surface MF to the protruding distal end P of the first outer terminal 81 is, the more the dimension in the thickness direction Td of the inductor component 10 can be inhibited from becoming excessively large. To inhibit the dimension in the thickness direction Td of the inductor component 10 from becoming excessively large, it is preferable that the distance TP in the thickness direction Td from the principal surface MF to the protruding distal end P of the first outer terminal 81 is less than about one-fifth of the dimension TBD in the thickness direction Td of the body BD.

In the above-described embodiment, when viewed from the thickness direction Td, the area of the range occupied by the first outer terminal 81 may be not more than the area of the range, which is exposed without being obstructed by the principal surface MF, of the first vertical wiring 71. If the area of the range occupied by the first outer terminal 81 is correspondingly small, contact with other outer terminals and conductive portions which are provided around the first outer terminal 81 can be avoided.

In the above-described embodiment, the first outer terminal 81 may cover something other than the principal surface MF. For example, the first outer terminal 81 may cover a side surface on the first end side in the transverse direction Wd of the body BD.

In the above-described embodiment, the position of the solder portion 81B when viewed from the thickness direction Td is not limited to the example in the embodiment. When viewed from the thickness direction Td, the geometric center of the solder portion 81B may coincide with the geometric center CV1 of the first vertical wiring 71. When viewed from the thickness direction Td, the geometric center of the solder portion 81B may be located outside the range occupied by the first vertical wiring 71.

In the above-described embodiment, the magnitudes of the first angle θ1 and the second angle θ2 are not limited to the examples in the embodiment. For example, the difference between the first angle θ1 and the second angle θ2 may be larger than about 15 degrees. To prevent lopsidedness in the longitudinal direction Ld in the first outer terminal 81, it is preferable that the difference between the first angle θ1 and the second angle θ2 is not more than about 15 degrees. The first angle θ1 and the second angle θ2 may be less than about 10 degrees or not less than about 30 degrees.

In the above-described embodiment, a relationship between voids 81C contained in the portion above the first vertical wiring 71 of the solder portion 81B and voids 81C contained in the portion above the second magnetic layer 55 is not limited to the example in the embodiment. There may be no voids 81C contained in the solder portion 81B or the amount of voids 81C contained in the portion above the first vertical wiring 71 of the solder portion 81B may be not less than the amount of voids 81C contained in the portion above the second magnetic layer 55. There may be no voids 81C inside the solder portion 81B.

In the above-described embodiment, the material for the solder portion 81B is not limited to an alloy containing, as main ingredients, tin and lead. The material for the solder portion 81B only needs to be an alloy containing tin. Specifically, the material may be an alloy containing tin, silver, and copper, an alloy containing tin and antimony, or an alloy containing tin and bismuth. A case where the material contains silver is preferable because a melting point of solder can be adjusted by increasing an additive amount of silver. An alloy of tin and antimony is higher in melting point than an alloy of tin, silver, and copper and supports mounting at high temperatures. If an alloy of tin and bismuth is adopted, a melting point can be made lower than that of an alloy of tin, silver, and copper. An alloy of tin, silver, and copper, in particular, is preferable because the alloy has an excellent balance between reliability and price. Note that the material for the solder portion 81B is an alloy containing tin and that examples of the material do not include pure-metallic tin.

As for the layers L1 to L5 according to the above-described embodiment, the present disclosure is not limited to a case where borders between the layers L1 to L5 are definite, and the borders may be indefinite. The layers L1 to L5 may warp or be distorted.

The material for the insulating layer 90 need not be a solder resist and may be a resin without photosensitivity or thermosetting properties. A material of the same type as a resin which is a base material for the magnetic layer 50 is preferable for the insulating layer 90 because closeness in contact increases. Specifically, if the base material for the magnetic layer 50 is an epoxy-based resin and the material for the insulating layer 90 is also an epoxy-based resin, closeness between the insulating layer 90 and the magnetic layer 50 in contact increases.

If a warp occurs in an inductor component or a substrate at the time of mounting the inductor component on the substrate, a principal surface of the inductor component may interfere with the substrate to prevent an outer terminal of the inductor component from coming into contact with a terminal of the substrate or to increase an interval between the terminals. In this case, faulty electrical continuity may occur between the outer terminal of the inductor component and the terminal of the substrate.

Figure 31:
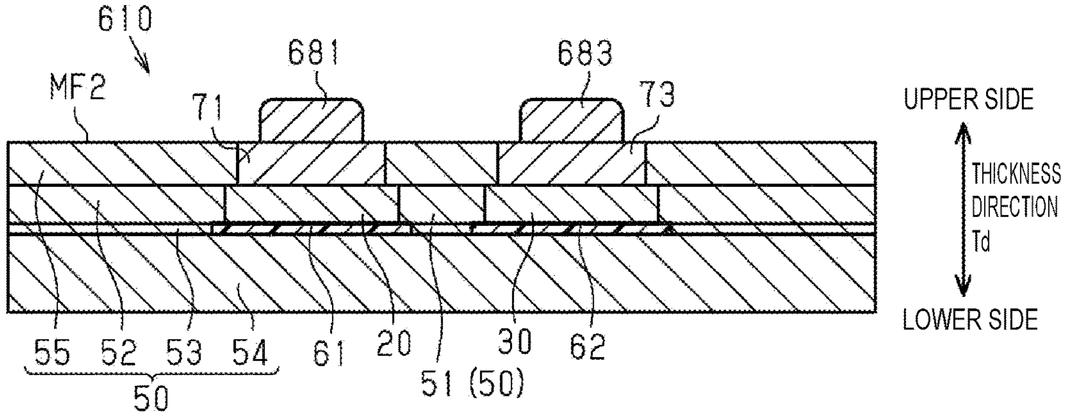
FIG. 31 shows an inductor component.

In an example shown in FIG. 31, a first outer terminal 681 is composed only of a layer made of copper and protrudes from a principal surface MF2 of a body BD. A third outer terminal 683 is composed only of a layer made of copper, like the first outer terminal 681. Assume that a warp occurs in an inductor component 610 or a substrate. In terms of bringing the first outer terminal 681 into solid contact with a terminal of the substrate, the first outer terminal 681 need not have a solder portion as long as the first outer terminal 681 protrudes from the principal surface MF2 of the body BD.

Figure 29:
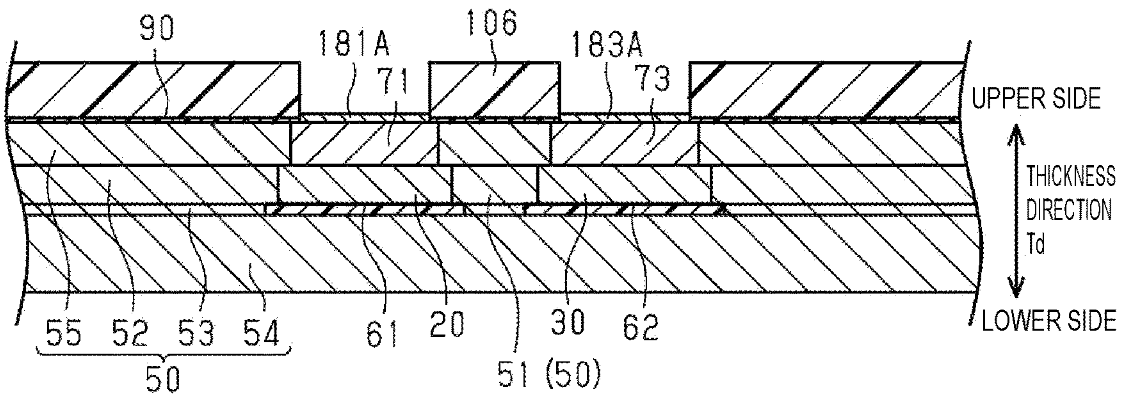
FIG. 29 is an explanatory view of a method for manufacturing the inductor component.

In the above-described embodiment, the method for manufacturing the inductor component 10 is not limited to the example in the embodiment. For example, each piece of vertical wiring may be formed not using plating but using a substantially column-shaped metal columnar member. As in the modification shown in FIG. 23, a copper layer included in a metal layer may be formed by a SAP. Specifically, after the first magnetic layer processing process of stacking the first magnetic layer 54 is performed, as shown in FIG. 15, a third coating process of forming third coating portions 106 on an upper surface of the insulating layer 90 is performed, as shown in FIG. 29. The third coating portions 106 are formed on the upper surface of the insulating layer 90 by photolithography identical to that in the method for forming the first coating portions 104.

Figure 30:
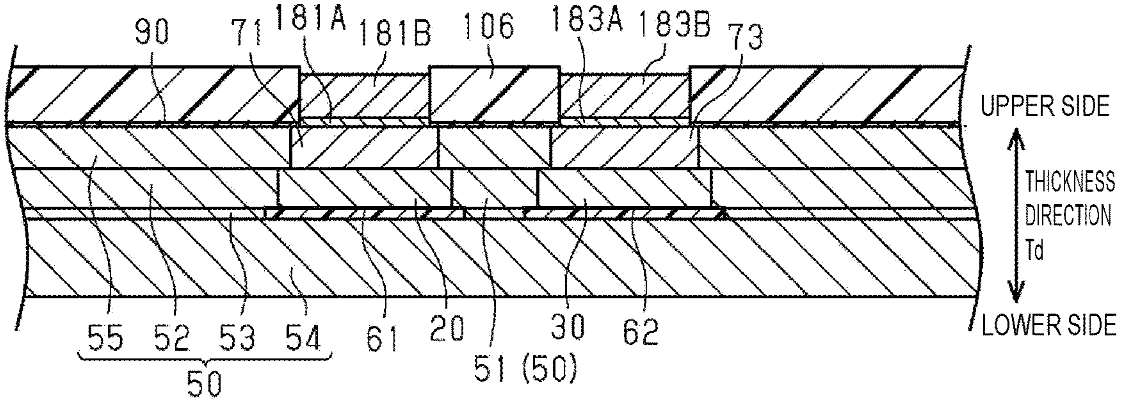
FIG. 30 is an explanatory view of the method for manufacturing the inductor component.

As shown in FIG. 30, copper layers are then formed by electrolytic copper plating at portions which are not coated with the third coating portions 106. After that, the inductor component 110 can be obtained by removing the third coating portions 106, forming solder portions on upper surfaces of the copper layers, and performing singulation. As described above, the copper layer 181B can be formed by a SAP, and adjustment of a dimension in a thickness direction Td is relatively easy.

Technical ideas that can be understood from the above-described embodiment and modifications will be additionally described below.

APPENDIX

An inductor component including a body which has a principal surface; inductor wiring which extends parallel to the principal surface inside the body; vertical wiring which is connected to the inductor wiring and extends in a thickness direction orthogonal to the principal surface to be exposed without being obstructed by the principal surface; and an outer terminal which is stacked on the vertical wiring exposed without being obstructed by the principal surface and at least part of which protrudes from the principal surface. A distance in the thickness direction from the principal surface to a distal end of the outer terminal is not less than about one-tenth of a dimension in the thickness direction of the body and less than about one-half (i.e., from about one-tenth of a dimension in the thickness direction of the body to less than about one-half).

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a body which has a principal surface;

inductor wiring which extends parallel to the principal surface inside the body, the inductor wiring having a wiring body which extends in a linear shape in a single layer, a first pad which is provided in the single layer on a first end portion of the wiring body, and a second pad which is provided in the single layer on a second end portion of the wiring body;

a first vertical wiring which is connected to the first pad and extends in a thickness direction orthogonal to the principal surface and is exposed without being obstructed by the principal surface;

a second vertical wiring which is connected to the second pad and extends in the thickness direction orthogonal to the principal surface and is exposed without being obstructed by the principal surface; and an outer terminal which is arranged on the first vertical wiring exposed without being obstructed by the principal surface and at least part of which protrudes from the principal surface, the at least part including a distal end that protrudes and that is a solder portion which is made of an alloy of tin lower in melting point than the inductor wiring and the first vertical wiring, wherein, when viewed in the thickness direction, the outer terminal is larger than the vertical wiring in a longitudinal direction but smaller than the vertical wiring in a transverse direction orthogonal to the longitudinal direction, the solder portion covers a range from above the first vertical wiring to above the body and has a plurality of voids inside, and a density of voids which are contained in a portion of the solder portion above the first vertical wiring is smaller than a density of voids of the solder portion which are contained in a portion above the body.

2. The inductor component according to claim 1, wherein the body has a first magnetic layer which is arranged on a side of the inductor wiring opposite to a side with the principal surface and a second magnetic layer which is arranged on the side with the principal surface of the inductor wiring, and the first vertical wiring and the second vertical wiring extend through the second magnetic layer.

3. The inductor component according to claim 1, wherein a distance in the thickness direction from the principal surface to the distal end of the outer terminal is less than one-half of a dimension in the thickness direction of the body, and a dimension in the thickness direction of the solder portion is not less than one-tenth of the dimension in the thickness direction of the body.

4. The inductor component according to claim 1, wherein a geometric center of the solder portion deviates from a geometric center of the first vertical wiring when viewed from the thickness direction.

5. The inductor component according to claim 4, wherein the geometric center of the solder portion is located within a range occupied by the first vertical wiring when viewed from the thickness direction.

6. The inductor component according to claim 1, wherein when a direction parallel to the principal surface is regarded as a first direction and a direction parallel to the principal surface and orthogonal to the first direction is regarded as a second direction, a dimension in the first direction of the solder portion is larger than a dimension in the second direction of the solder portion and a dimension in the first direction of the first vertical wiring.

7. The inductor component according to claim 6, wherein in a section which is orthogonal to the second direction and includes the distal end of the outer terminal, when an acute angle, which a line segment connecting the distal end of the outer terminal and a first end in the first direction of the outer terminal forms with a line segment connecting the first end in the first direction of the outer terminal and a second end in the first direction of the outer terminal, is regarded as a first angle, and when an acute angle, which a line segment connecting the distal end of the outer terminal and the second end in the first direction of the outer terminal forms with the line segment connecting the first end in the first direction of the outer terminal and the second end in the first direction of the outer terminal, is regarded as a second angle, a difference between the first angle and the second angle is not more than 15 degrees.

8. The inductor component according to claim 6, wherein in a section which is orthogonal to the second direction and includes the distal end of the outer terminal, when an acute angle, which a line segment connecting the distal end of the outer terminal and a first end in the first direction of the outer terminal forms with a line segment connecting the first end in the first direction of the outer terminal and a second end in the first direction of the outer terminal, is regarded as a first angle, and when an acute angle, which a line segment connecting the distal end of the outer terminal and the second end in the first direction of the outer terminal forms with the line segment connecting the first end in the first direction of the outer terminal and the second end in the first direction of the outer terminal, is regarded as a second angle, the first angle is from 10 degrees to less than 30 degrees, and the second angle is from 10 degrees to less than 30 degrees.

9. The inductor component according to claim 1, wherein a surface of the solder portion has a curved shape, a curvature of which decreases toward the distal end of the outer terminal when viewed from a direction parallel to the principal surface.

10. The inductor component according to claim 1, wherein the distal end of the outer terminal is planar and parallel to the principal surface.

11. The inductor component according to claim 1, wherein a conductive portion different from the outer terminal is exposed without being obstructed by the principal surface, and a distance in the thickness direction from the principal surface to an upper surface of the conductive portion is smaller than a distance in the thickness direction from the principal surface to the distal end of the outer terminal.

12. The inductor component according to claim 1, wherein the outer terminal further has a metal layer which covers the first vertical wiring exposed without being obstructed by the principal surface, and the solder portion covers a surface of the metal layer.

13. The inductor component according to claim 12, wherein a dimension in the thickness direction of the solder portion is larger than a dimension in the thickness direction of the metal layer.

14. The inductor component according to claim 12, wherein a dimension in the thickness direction of the solder portion is less than a dimension in the thickness direction of the metal layer.

15. The inductor component according to claim 12, wherein a surface of the metal layer on a side where the outer terminal protrudes has a convex shape which is convex toward the side where the outer terminal protrudes from the principal surface.

16. The inductor component according to claim 12, wherein a surface of the metal layer on a side where the outer terminal protrudes includes a planar-shaped portion and a non-planar-shaped portion.

17. The inductor component according to claim 1, further comprising:

when the outer terminal is regarded as a first outer terminal, a second outer terminal which is arranged on the second vertical wiring exposed without being obstructed by the principal surface and at least part of which protrudes from the principal surface, the at least part including a distal end that protrudes and that is a solder portion which is made of an alloy of tin lower in melting point than the inductor wiring and the second vertical wiring, wherein a distance in the thickness direction from the principal surface to the distal end of the first outer terminal is different from a distance in the thickness direction from the principal surface to the distal end of the second outer terminal.

18. The inductor component according to claim 17, wherein a distance between a geometric center of the first outer terminal and a geometric center of the body is larger than a distance between a geometric center of the second outer terminal and the geometric center of the body when viewed from the thickness direction, and the distance in the thickness direction from the principal surface to the distal end of the first outer terminal is larger than the distance in the thickness direction from the principal surface to the distal end of the second outer terminal.

19. The inductor component according to claim 1, further comprising:

when the inductor wiring is regarded as first inductor wiring, and when the outer terminal is regarded as a first outer terminal, second inductor wiring which extends, separately from the first inductor wiring, parallel to the principal surface inside the body;

third vertical wiring which is connected to the second inductor wiring and extends in the thickness direction and is exposed without being obstructed by the principal surface; and a third outer terminal which is arranged on the third vertical wiring exposed without being obstructed by the principal surface and at least part of which protrudes from the principal surface, the at least part including a distal end that protrudes and that is a solder portion which is made of a material lower in melting point than the second inductor wiring and the third vertical wiring, wherein a minimum distance of a gap between the first outer terminal and the third outer terminal is smaller than a minimum dimension of the first outer terminal which passes through a geometric center of the first outer terminal and a minimum dimension of the third outer terminal which passes through a geometric center of the third outer terminal when viewed from the thickness direction.

* * * * *